United States Patent [19]

DeVitt et al.

[11] Patent Number: 5,212,733
[45] Date of Patent: May 18, 1993

[54] SOUND MIXING DEVICE

[75] Inventors: Douglas J. DeVitt, Weston; Kristoph D. Krug, Framingham, both of Mass.

[73] Assignee: Voyager Sound, Inc., Weston, Mass.

[21] Appl. No.: 486,151

[22] Filed: Feb. 28, 1990

[51] Int. Cl.$^5$ .............................................. H04B 1/00
[52] U.S. Cl. ....................................................... 381/119
[58] Field of Search ................... 381/61, 63, 1, 17, 18, 381/119; 84/622, 645

[56] References Cited

U.S. PATENT DOCUMENTS

| | | |
|---|---|---|
| 3,757,046 | 9/1973 | Williams . |
| 3,982,071 | 9/1976 | Weiss et al. . |
| 4,399,328 | 8/1983 | Franssen et al. . |
| 4,683,589 | 7/1987 | Scholz et al. ............................ 381/61 |
| 4,731,848 | 3/1988 | Kendall et al. ......................... 381/61 |
| 4,792,974 | 12/1988 | Chace ................................... 381/17 |
| 4,817,149 | 3/1989 | Myers ................................... 381/63 |
| 4,864,625 | 9/1989 | Hanzawa et al. ...................... 381/61 |
| 4,885,792 | 12/1989 | Christensen et al. ................ 381/119 |
| 4,933,768 | 6/1990 | Ishikawa et al. ......................... 381/1 |
| 5,027,689 | 7/1991 | Fujimori ............................... 84/622 |

OTHER PUBLICATIONS

Chamberlin, Musical Applications of Microprocessors, 1980, p. 268.
"Ballade", sequencer for MT-32, advertisement (Pynaware Corp., 1988) in Electronic Musician, Dec., 1988, p. 19.
Ryle, G., "Multi-Tasking for Musicians" *Start,* vol. 3, No. 12 Jul. 1989 pp. 24-25.
Digital Music Services brochure entitled "DMP7 PRO" and dated 1987.
Croft, Simon, "JMS C-Mix Fader Automation" *Sound* (Oct. 1987) pp. 52, 54.
MegaMix advertisement in *Post,* Sep. 1987, p. 34.
JL Cooper Electronics brochure entitled "Affordable Automation" and distributed in 1987.
Lehrman, Paul D., "The Future of MIDI Time Code", *Recording Engineer/Producer,* Oct. 1987, pp. 106-107, 110-113.
"Andrew Von Gamm takes a look at AKG's Creative Audio Processor", *Studio Sound,* Oct. 1989, pp. 38, 40.

A brochure by AKG Acoustics, Oct. 1988, printed in Austria.
Sippl, Fritz, D. Ing., F.A.E.S., "New Trends in Professional Audio", Issue 1990.
Keller, Helmut, "Universal Switchpoint Matrix and Automation Fader/Mixer System", An Audio Engineering Society Preprint, presented Mar. 1-4, 1988, Preprint 2611 (G-8).
Nadler, Wilhelm, Dipl-Ing., "Delta Stereo Compact Processor (DSP 610) to Utilize a New Directional Sound Reinforcement System", An Audio Engineering Society Preprint, presented Nov. 12-16, 1986, Preprint 2391 (D-17).
Nadler, Wilhelm, Dipl-Ing., "The DSP 610—A Compact to Utilise a New Directional Sound Reinforcement System", An Audio Engineering Society Preprint, presented Mar. 10-13, 1987, Preprint 2472 (K-2).
Richter, F. and Persterer, A. "Design and Applications of a Creative Audio Processor" An Audio Engineering Society Preprint, presented Mar. 7-10, 1989, Preprint 2782 (U-4).

*Primary Examiner*—Forester W. Isen
*Attorney, Agent, or Firm*—Fish & Richardson

[57] ABSTRACT

A system for interactively controlling multiple parameters affecting an audio output, the system employing a controller with a visual display (e.g., a cathode ray tube) for displaying an icon that is a visual representation of an input sound signal in a multidimensional space and an input device (e.g., a mouse) used to control the location of the icon on the display. The controller generates a multiple parameter control signal that is based upon the location of the icon and is used by a sound signal processing circuit to control multiple parameters affecting an audio output. The icons are images of the sources of sound input signals. The sound signal processing circuit has M times N controllable amplifiers arranged in an M by N matrix in which each of the M inputs is distributed to N controllable amplifiers and the outputs of M controllable amplifiers are combined to provide each of the N outputs. Each controllable amplifier has a unique combination of an input signal and an output signal and receives a unique, continuously variable gain control signal.

53 Claims, 9 Drawing Sheets

SOUND MIXING DEVICE

BACKGROUND OF THE INVENTION

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

The present invention relates to interactively controlling multiple parameters affecting an audio output.

It is known to mix sound input signals into sound output signals using a sound mixing board which includes separate manually activated controls for each sound input signal. The sound input signals may include signals from a plurality of musical instruments and voices as well as sound effects. The controls may include pan (i.e., position) and gain (i.e., amplitude) controls. The sound output signals may be provided to speakers or any recording device.

Sound input signals are mixed to control the position of the signal relative to a listener as well as to control the relative level of an input signal with respect to other input signals. The position of an input signal is controlled by adjusting the amount of the input signal which is provided to each output channel. E.g., for a stereo mix environment (i.e., an environment which includes a left output channel and a right output channel) an input signal which is located directly to the right of the listener is provided to the right output channel while the left output channel is attenuated. The relative level/position of the input signal is controlled by adjusting the amplitude of the input signal which is provided to each output channel.

It is also known to mix sound input signals using a computer system which imitates the controls of a sound mixing board. In such a computer system, the controls are displayed on the screen of the computer as they might appear on the mixing board. Steinberg/Jones, Northridge, Calif. produces such a computer system under the trade designation MIMIX.

It is also known to use external processors such as compressors, limiters, equalizers, reverb units, delay units, to achieve certain effects, e.g., in synthesizing sound or in editing of audio and audiovisual works.

SUMMARY OF THE INVENTION

Our invention features in general a system for controlling multiple parameters affecting an audio output. The system employs a controller with a visual display (e.g., a cathode ray tube) for displaying an icon that is a visual representation of an input sound signal in a multidimensional space. An input device (e.g., a mouse) is used to control the location of the icon on the display. The controller generates a multiple parameter control signal that is based upon the location of the icon and is used by a sound signal processing circuit to control multiple parameters affecting an audio output. With the invention, the states of multiple parameters can be simultaneously controlled and usefully displayed, permitting precision and flexibility in real time dynamic sound control, and permitting the sound engineer to achieve complex mixes with a large number of parameters.

In preferred embodiments a plurality of icons can be used to control a plurality of input sound signals. The parameters could include gains for respective outputs in a multiple output channel environment (e.g., a stereo mix or Dolby system), one or more reverb parameters, equalization parameters, filtering parameters, and compression parameters. The multidimensional space could represent the physical location of a listener in a stereo environment relative to the sources of sound, and the display could include hard left and hard right regions and a nonlinear fadeout region. The units of gain associated with the display could be rescalable. The multidimensional space could alternatively represent a scene of an audiovisual work; locations in the space associated with locations in the scene would have associated audio parameter sets, e.g., stored in a look-up table. State information as to positions of the icons at any instantaneous time and changes in position with time can be stored for later playback, editing and synthesis.

In another aspect, our invention features, in general, a system employing icons that are images of the sources of input sound signals on a visual display for interactively controlling multiple parameters affecting an audio output. This facilitates identification of the source of the input sound signal by the sound engineer, something that is particularly advantageous when there are a large number of input sound signals to control and monitor.

In another aspect, our invention features, in general, a system for interactively controlling the modification of M input sound signals to provide N output sound signals. The system includes a sound signal processing circuit having M times N controllable amplifiers arranged in an M by N matrix in which each of the M inputs is distributed to N controllable amplifiers and the outputs of M controllable amplifiers are combined to provide each of the N outputs. Each controllable amplifier has a unique set of an input signal and an output signal and receives a unique, continuously variable gain control signal. Such a system provides great flexibility in achieving complex sound mixes and complex real time changes in sound mixes.

In preferred embodiments, each controllable amplifier includes a digital-to-analog converter (DAC) that receives a multibit gain control signal and a voltage controlled amplifier that receives the control voltage output of the DAC; the DACs have slew limiting of the control voltage to eliminate control voltage artifacts in the output signals; and a decoder circuit receives gain control signals for all controllable amplifiers with addresses identifying which gain control signals apply to which amplifiers.

Other advantages and features of the invention will be apparent from the following description in a preferred embodiment thereof and from the claims.

DESCRIPTION OF THE PREFERRED EMBODIMENT

The drawings are first briefly described.

DRAWINGS

STRUCTURE

Figure 1:
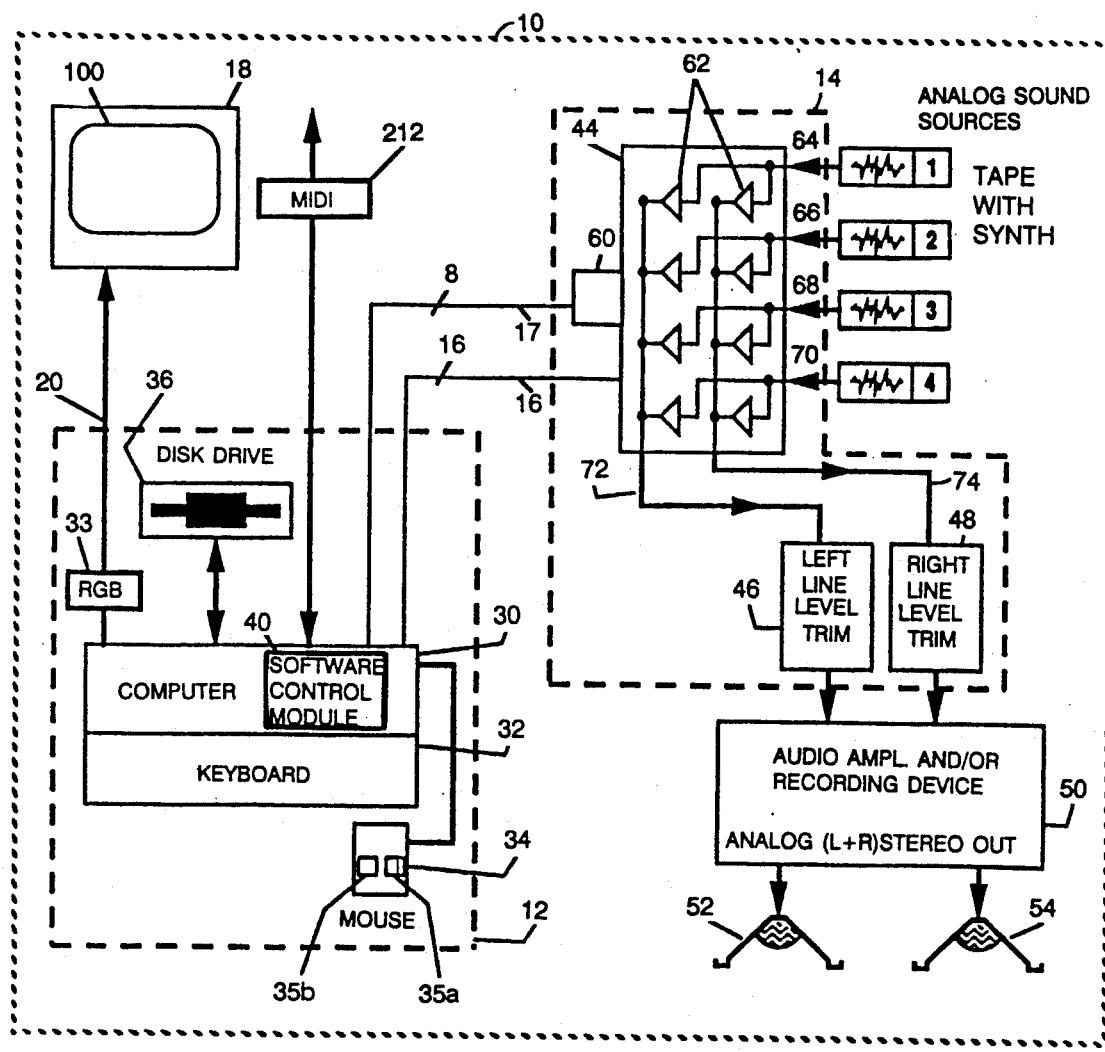
FIG. 1 shows a diagrammatic-block diagram of a sound mixing system according to the invention.

Referring to FIG. 1, in real time, interactive sound mixing system 10, computer system 12 communicates with mixing circuit 14 via 16-bit data bus 16 (only 12 bits are used in this embodiment) and 8-bit address and control bus 17 (6 bits for address and 2 bits for control), as well as with display 18 (e.g., a color cathode ray tube (CRT)) via display interconnect 20. Computer system 12 includes computer 30 (e.g., an Atari 1040ST), which may be controlled via either keyboard 32 or mouse 34, as well as storage media 36 (e.g., a disk drive), RGB (red, green, blue) interface 38 and control module 40, which is software loaded on computer 30. (A computer listing for the software is incorporated herein as the Appendix.) Computer 30 utilizes a GEM operating system. The software for control module 40 is implemented in an interpretative and compilable GFA Basic (3.0 Version) available from Antic Software, San Francisco, Calif. Mouse 34 includes two activation buttons, right button 35a and left button 35b. Computer system 12 acts as an interactive controller that generates multiple parameter control signals provided to mixing circuit 14, which acts as a sound signal processing circuit that modifies input sound signals to provide output sound signals based upon the multiple parameter control signal.

Mixing circuit 14 includes voltage-controlled amplifier (VCA) cross-point matrix 44, a programmable-gain matrix, which receives sound input signals (e.g., from analog sound sources such as tapes, compact disks, synthesizers, musical instruments and voices) and provides sound output signals to right and left line level trim circuits 46, 48. Trim circuits 46, 48 provide sound output signals to audio amplifier 50, which provides audio output signals to left and right speakers 52, 54 or recording devices.

Cross-point matrix 44 includes address decoder circuit 60, which receives address and control information over address and control bus 17, as well as a plurality of controllable amplifiers 62, which receive amplitude control information over data bus 16 as well as sound input signals via input channels 64, 66, 68, 70. Controllable amplifiers 62 provide sound output signals via output channels 72, 74. Each input channel 64, 66, 68, 70 provides its respective input signal to a pair of controllable amplifiers 62, which each provide an output signal on a respective output channel 72, 74. Accordingly, the number of controllable amplifiers 62 in the VCA cross-point matrix is defined by the number of input channels times the number of output channels. (I.e., 2 output channels × 4 input channels = 8 amplifiers.)

Figure 2:
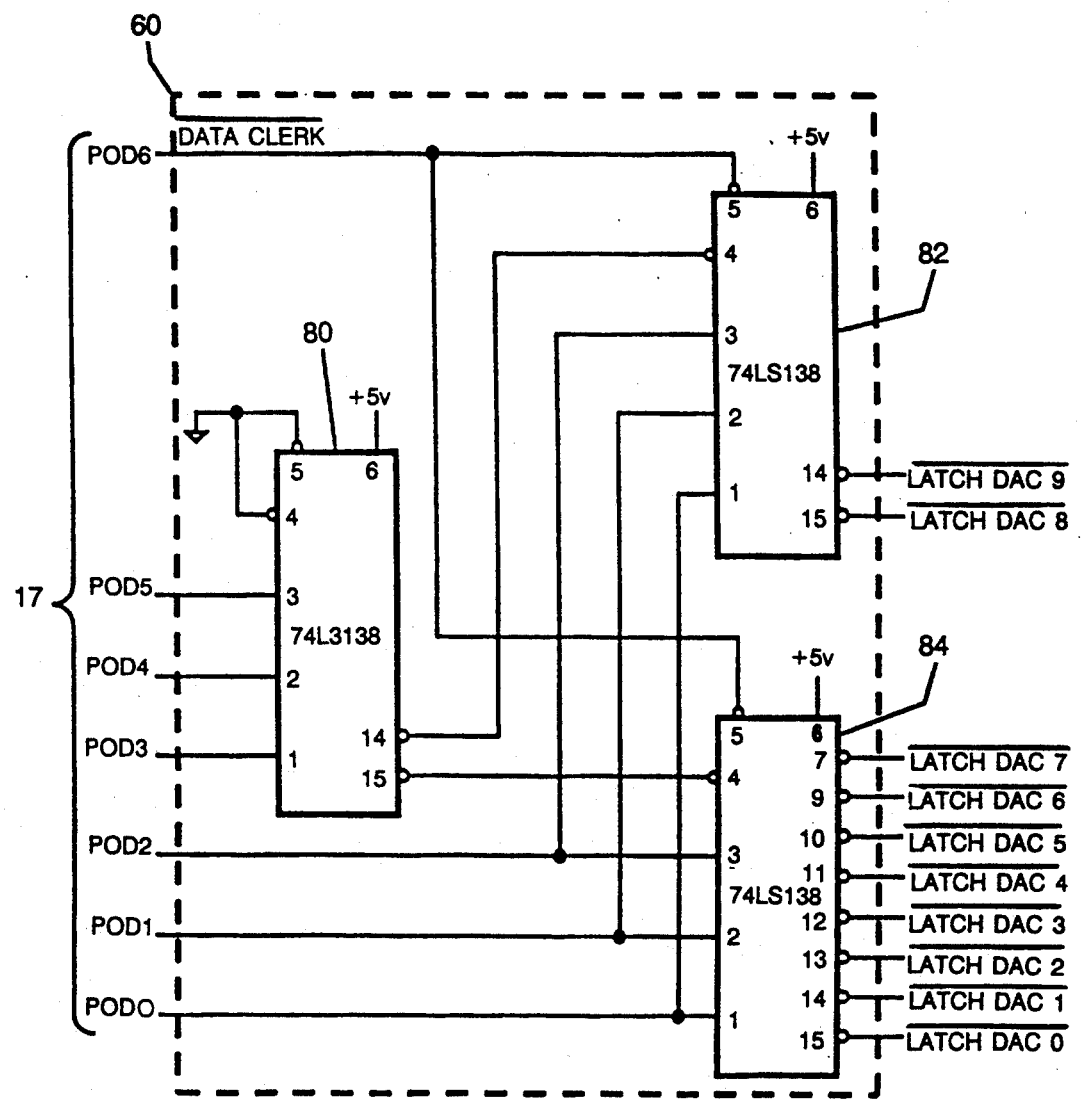
FIG. 2 shows a schematic-block diagram of a decoder circuit of the FIG. 1 sound mixing system.

Referring to FIG. 2, decoder circuit 60 includes an arrangement of three 3:8 decoders. More specifically, enable decoder 80 (available under the trade designation 74LS138) receives three enable bits via address and control bus 17 and provides enable signals to decoders 82, 84 (available under the trade designation 74LS138), which also receive three address bits and $\overline{\text{DATA CLK}}$ (one of the control bits) via bus 17. Decoders 82, 84 provide a plurality of active low enable signals $\overline{\text{LATCH DAC 0/}}$ to $\overline{\text{LATCH DAC 9/}}$.

Figure 3:
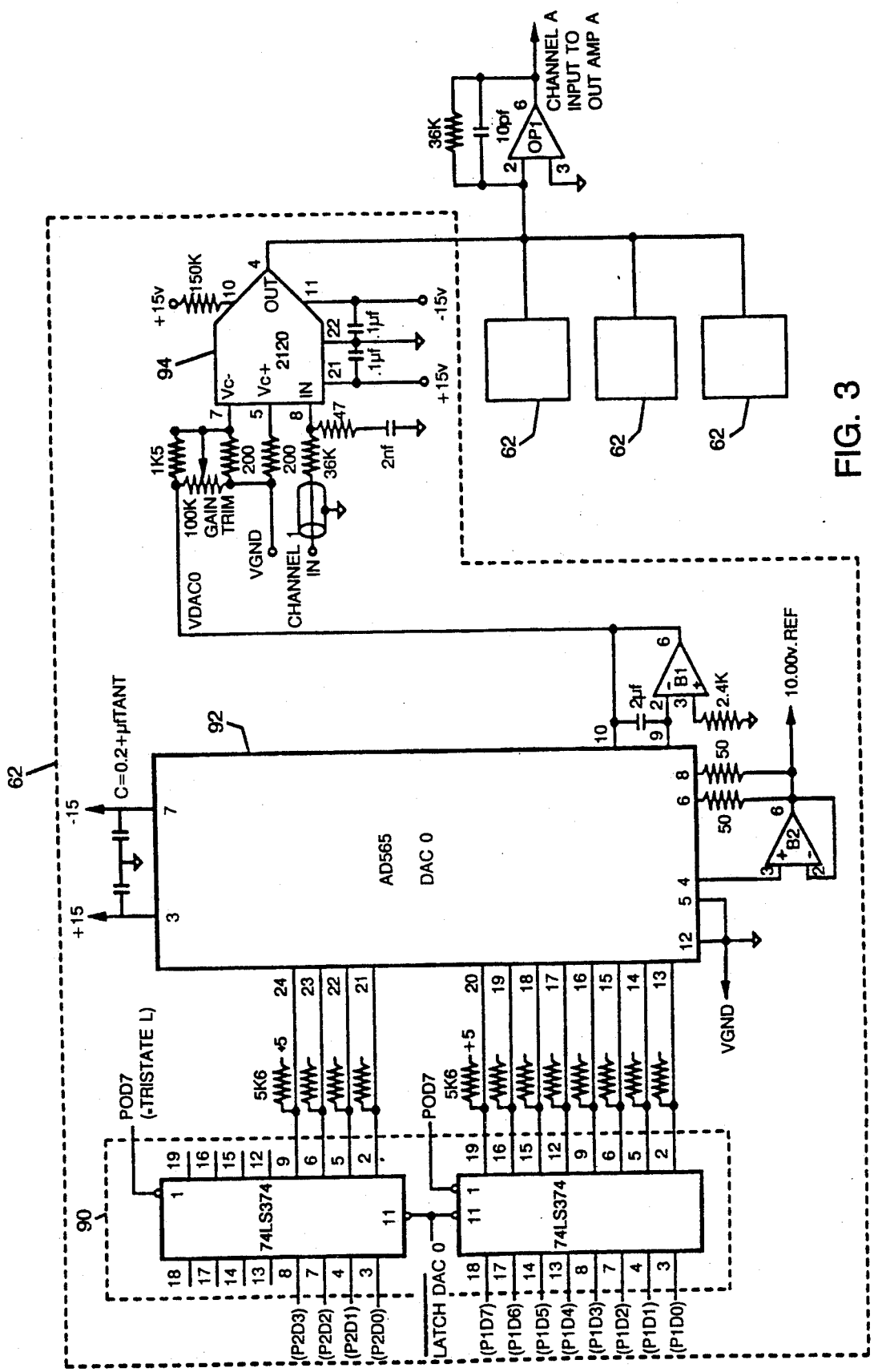
FIG. 3 shows a schematic-block diagram of an arrangement of controllable amplifiers of the FIG. 1 sound mixing system.

Referring to FIG. 3, each controllable amplifier 62 includes register circuit 90, which receives twelve bits of data via data bus 16, digital-to-analog converter (DAC) 92 (available from Analog Devices under the trade designation AD565), which receives registered data from register circuit 90, and voltage controlled amplifier (VCA) 94 (available from P.M.I., Inc. under the trade designation 2120), which receives a V DAC control signal from DAC 92 as well as a sound input signal via an input channel. VCAs 94 provide a logarithmic output gain for a linear voltage control input signal. A remote ground signal (VGND) is also provided to the gain adjust input terminal of each VCA 94; thus, the gain of all the VCAs is adjusted equally.

Still referring to FIG. 3, the output terminals of four controllable amplifiers 62 are tied together to provide a summation of output currents and provide a signal to operational amplifier OPI which provides a first sound output signal (e.g., the right sound output signal). The output terminals of four other controllable amplifiers 62 are tied together to provide a second sound output signal (e.g. the left sound output signal).

Figure 4:
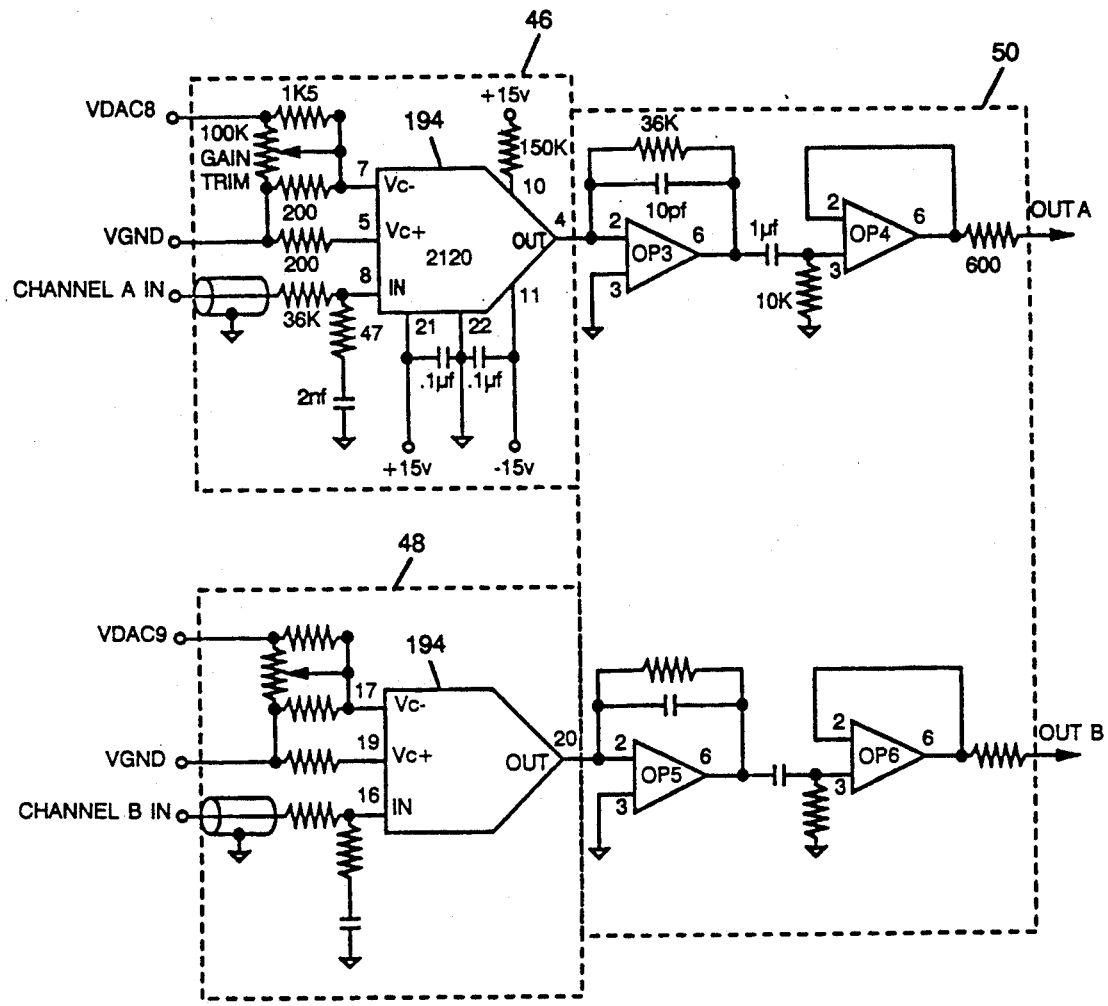
FIG. 4 shows a schematic-block diagram of line level trim circuits of the FIG. 1 sound mixing system.

Referring to FIG. 4, line level trim circuits 46, 48 each include a DAC (not shown), which receives a digital signal from data bus 16 and provides an input control signal (VDAC 8 or VDAC 9) to a respective VCA 194. Each VCA also receives a sound output signal from one of the chains of controllable amplifiers. Each level trim circuit VCA 194 provides a sound output to the respective left or right channel of audio amplifier 50. Each channel of audio amplifier 50 includes a pair of cascaded operational amplifiers.

Figure 5A:
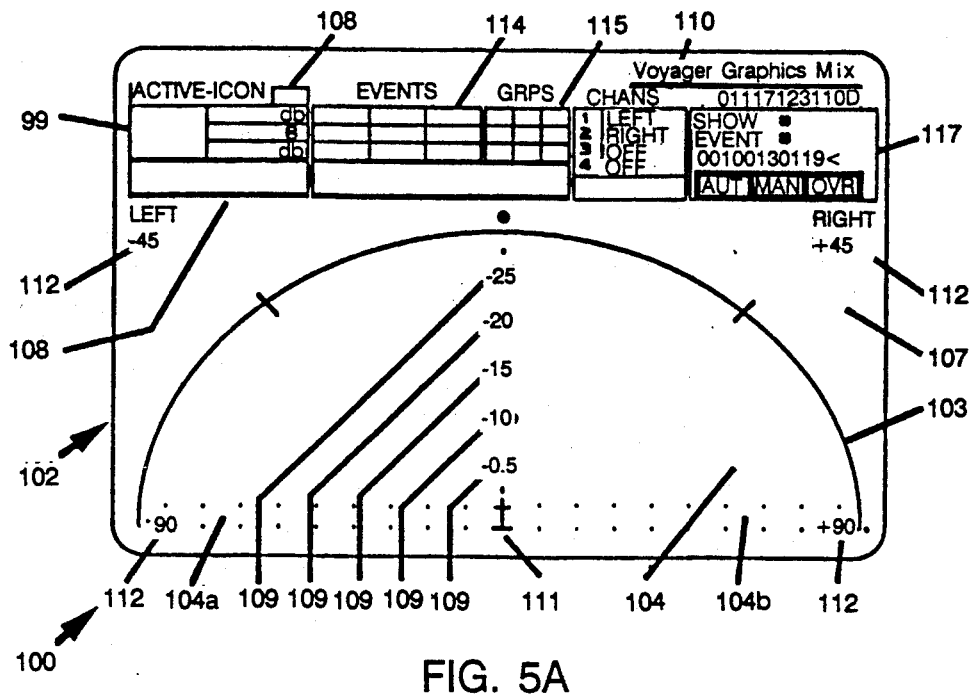
FIGS. 5A and 5B show examples of displays for the FIG. 1 mixing system.
Figure 5B:
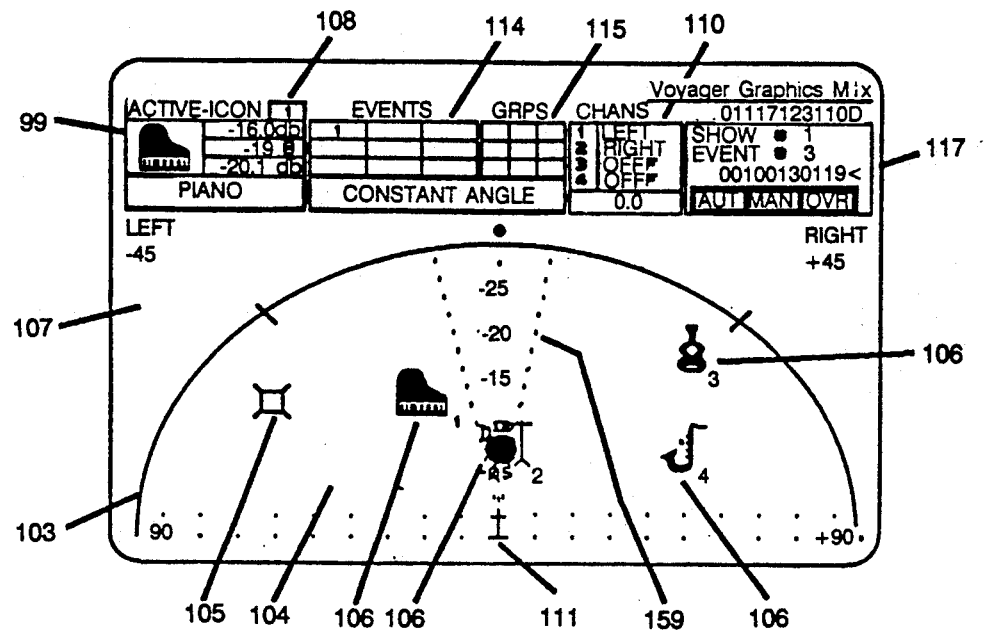

Referring to FIGS. 5A and 5B, sound mixing system 10 uses display 18 to provide video display 100 which displays sound input signals in a two-dimensional sound output channel space. FIG. 5A shows an empty video display (i.e., the sound output channel space), while FIG. 5B shows a video display 100 which displays the mix of four input signals. The video display 100 of an output signal space for a stereo mix environment includes a mix portion 102 (the output channel space) which displays angle of displacement from center as $\theta$ and radial distance, which is related to relative sound amplitude, in decibels (dB).

Mix portion 102 (where icons 106 are moved to actively mix an input signal) includes elliptical boundary 103 which delineates main mix portion 104 (where the majority of the mixing is accomplished) and nonlinear fadeout portion 107 (where icons are moved to gradually fade an input sound signal to mute, i.e., −90 dB). At the bottom of main mix portion 104 are hard left portion 104a and hard right portion 104b. Main mix portion 102 also includes amplitude indicators 109, which generally indicate attenuation relative to listener origin 111, and position indicators 112, which generally indicate angular position relative to listener origin 111. Amplitude indicators 109 could be rescaled (e.g, to show 3 dB increments instead of 5 dB increments), if desired. The position of mouse 34 is displayed by cursor 105, and input channels are displayed as icons 106, which are visual representations of the input sound signal sources. Icons 106 may have the appearance of the element providing the respective sound input signal. (E.g., a guitar which provides a sound input signal would have a guitar shaped icon.)

Video display 100 also includes information portion 99, which provides information about input channels which are displayed on video display 100. Information portion 99 includes active icon portion 108, which displays the "active" icon as well as mix information (e.g., left and right gain and angular displacement relating to that icon), output channel portion 110, which provides information regarding the status of the output channels, events portion 114, which displays different stored states (i.e., a particular configuration of icons) of a particular mix, groups (GRPS) portion 115, which displays whether the active icon is part of a group of icons which are configured to move together, and SMPTE (Society of Motion Picture and Television Engineers) time-code readout 117, which provides information relating to time reference coding of a particular mix.

OPERATION

Referring to FIGS. 1, 5A and 5B, sound mixing system 10 is used to mix one or more sound input signals into a plurality of sound output signals by displaying the sound input signals in a multidimensional sound output signal space. (FIGS. 5A and 5B show the output signal space for a stereo mix environment.) Mouse 34 and keyboard 32 are used to move icons representing sound input signals around the screen display representing the space of the sound output signals. As the icons are moved, the mix of the input signals changes.

More specifically, when cursor 105 is positioned over an icon 106, right button 35a of mouse 34 is depressed, and that icon 106 becomes the active icon (i.e., the icon 106 which represents the input signal which is being mixed). Left button 35b is depressed, and the active icon is moved around display 100 by moving mouse 34 according to known techniques. If both right and left buttons are depressed over the active icon, then the icon may be moved along or around a constant radius. For example, in the stereo mix environment, as an icon moves around the central radius, the relative position of the sound input signal (i.e., the amount of the sound input signal being supplied to the right output channel and the amount of the sound input signal being supplied to the left output channel) changes. Also, as the icon moves along the radius, the strength (i.e., the gain) of the sound input signal changes. Thus, by simply moving an icon to a desired mix position, the mix of the input sound signal is accomplished. After the mix of the input signal has been completed, the position of the icon on the display may be stored for future use with disk drive 36.

Figure 6A:
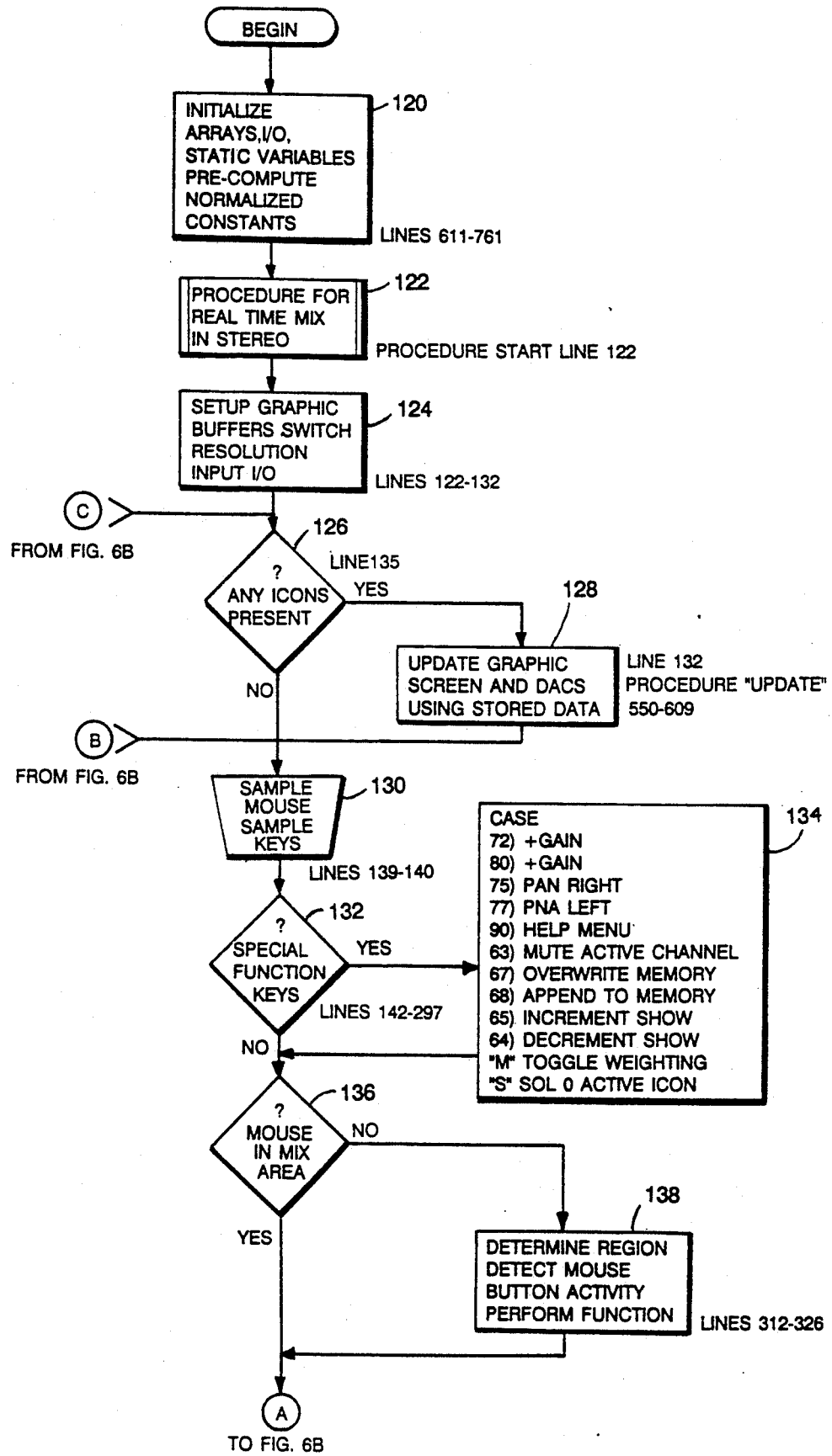
FIGS. 6A to 6C show a flow chart of a partial control module of the FIG. 1 sound mixing system, which is responsible for the real time mixing.
Figure 6B:
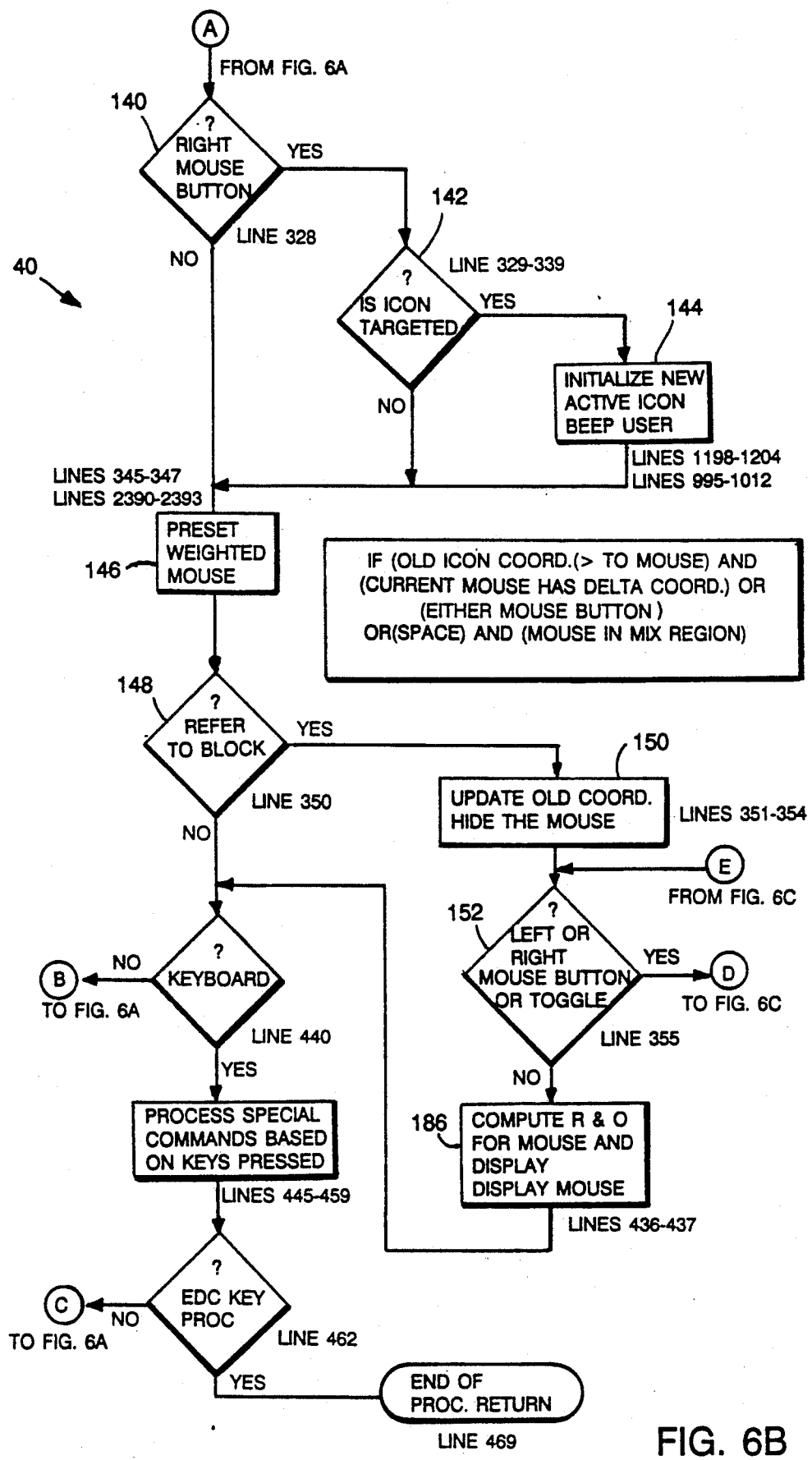
Figure 6C:
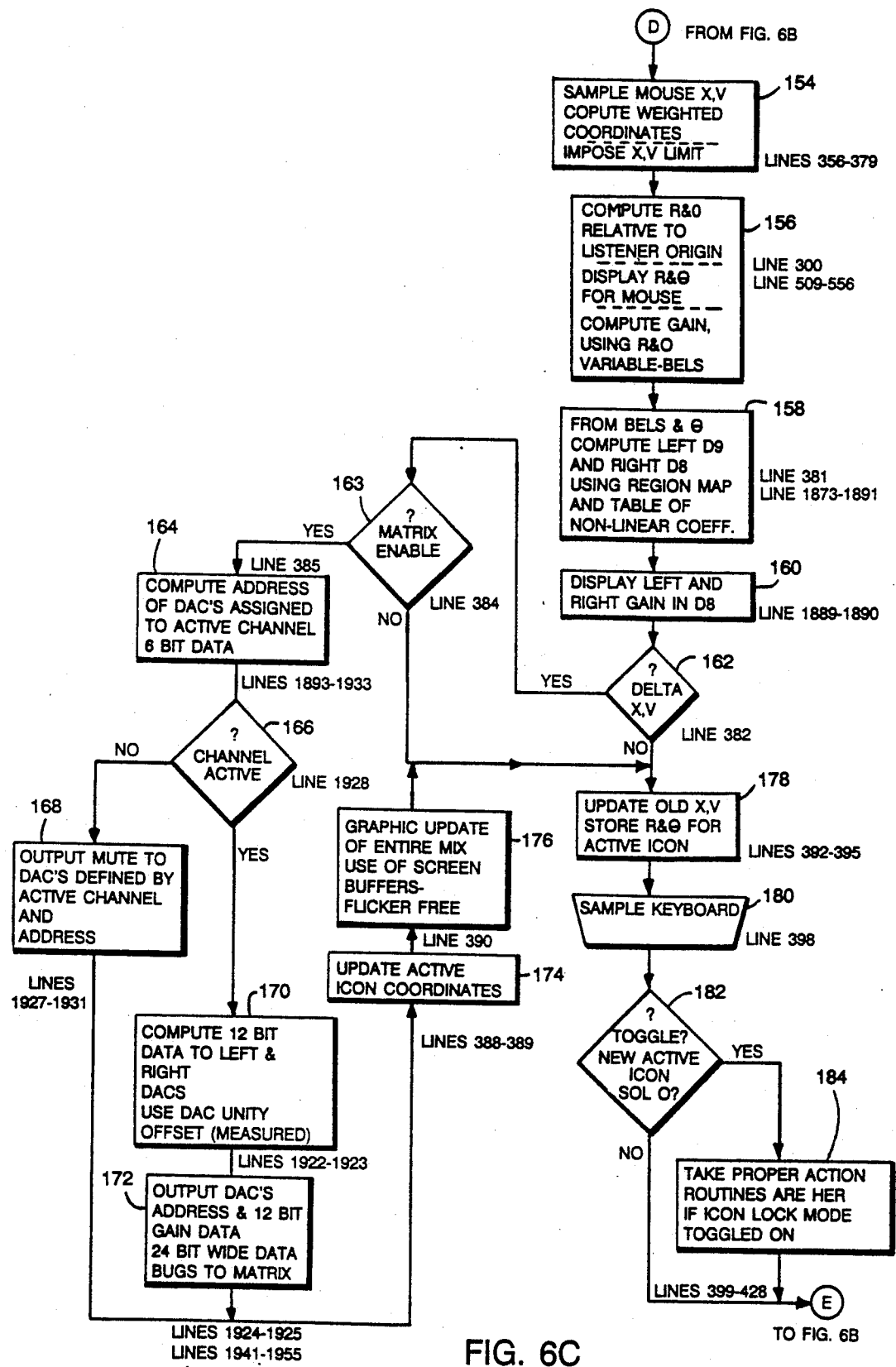

Referring to FIGS. 6A-6C, a flow chart of control module 40 of real time mix system 10 is shown. Line references in the flow chart are to the lines of the listing in the Appendix hereto. More specifically, at initialization step 120, normalized coefficients are precomputed and ranges of variables are initialized. The left and right gain coefficients are computed using the following equations:

$$\text{left\_dB\_coef} = 20 \times \text{LOG}_{10}(\text{MAX (SIN}(90-i)/2), 0.001))$$

$$\text{right\_dB\_coef} = 20 \times \text{LOG}_{10}(\text{MAX (COS}(90-i)/2), 0.001))$$

where:
MAX = a function which provides the greater of the two numbers in the parenthetical, and
i = an angular position relative to a listener.

The coefficients of dB v. angular position (relative to listener) are stored in a two-dimensional look-up table, thus, allowing module 40 to function faster because these coefficients need not be generated for every mix action. At real time mix step 122, control module 40 has finished its initialization and starts a mix of input sound signals to stereo output signals.

At setup graphic buffers step 124, graphic buffers are provided so that a previous mix (such as a mix which is retrieved from disk drive 36) may be stored while a present mix is being generated. Also, in step 124, the resolution of display 18 is configured to allow computer 30 to function in an environment having 320 locations in the x direction by 200 locations in the y direction. Also, computer 30 causes 320 by 200 pixels to be displayed on display 18 and mouse 34 to be initialized for this configuration. By initializing mouse 34 for this configuration, a location on display 18 corresponds to a functional location of computer 30. Thus, computer 30 may be controlled simply by referring to cursor 105 which is controlled by mouse 34 and displayed on display 18.

At icon step 126, control module 40 determines if any icons are present on display 100. If icons are present, then there is a preexisting mix of information; if no icons are present, then there is no mix present and, thus, the mix need not be updated at this time.

If there is an icon present, then at step 128, the graphics are updated. More specifically, the x and y coordinates of the icon are used to update all the values displayed on screen 100 as well as to update each controllable amplifier 62.

At step 130, mouse 34 and keyboard 32 are sampled to determine if any action has been taken. At step 132, the results of the sample are analyzed to determine if any special function keys have been pressed. If so, then step 134, which includes subroutines for the special functions, is used to instruct computer 30 how to react to a particular function key. Functions include: increase gain, decrease gain, pan left, pan right, etc.

At step 136, video display 100 is scanned to determine if cursor 105, which is controlled by mouse 34, is in mix portion 102. If cursor 105 is not in the mix area, then at step 138, the mouse may be used to control special functions of control module 40 (e.g., the mouse may be used to control a pull-down menu). The pull-down menu is an alternative to the special function keys used in step 132.

At step 140, control module 40 checks to see if right button 35a of mouse 34 has been activated. If so then, at step 142, control module 40 checks to see if any icon is targeted by mouse 34 (i.e., to see if the cursor, which is controlled by mouse 34, is positioned over an icon). If so then, at step 144, control module 40 initializes a new icon and updates the graphics of active icon portion 108 of display 100 to indicate the new active icon. If no new icon is activated, then control module 40 continues to operate with a prior icon.

At step 146, a moving average is set up for the moving mouse. More specifically, seven previous locations of the mouse are stored and weighted together in a conventional manner. Because module 40 is functioning so quickly, the seven previous locations are generated at a speed which is virtually transparent to the user and listener. Each time the mouse is updated (i.e., moved) then the standard traveling average is automatically updated. Thus, movements of the mouse provide a substantially continuously flowing output signal. The weighing function may be adjusted in a conventional manner to provide a faster or slower ramping movement of mouse 34, and thus of the mix.

At step 148, the mouse position is analyzed to determine if DACs 92 need to be updated (e.g., due to movement of mouse 34 or use of special functions). If so then, at step 150, control module 40 updates the coordinates displayed by video display 100 and provided to controllable amplifiers 62; mouse cursor 105 is also hidden so that mouse 34 moves an icon 106 rather than cursor 105.

At step 152, control module 40 determines whether mouse 34 is activated by toggling one or both of its buttons 35a, 35b. If mouse 34 is activated, then at step 154, the x, y coordinates of mouse 34 are sampled, a weighted path for mouse 34 is computed, and a limit is imposed to prevent the icon from moving beyond the mix zone.

At step 156, gain information (r) and pan information ($\theta$) are computed relative to listener origin 111 by converting standard x, y location values to polar coordinates relative to the listener origin. The listener origin may be different from the computer screen origin. E.g., in the stereo environment shown in FIGS. 5A and 5B, the listener origin is at the center, bottom screen.

At step 158, left dB and right dB values are computed based upon the r and $\theta$ values. In general, the r value is first used to calculate a value for a "bels" variable; if the icon is within region 104, r is simply multiplied times a scaling factor "d-scale", which has a value of 0.1875; if the icon is outside of region 104 in region 107, bels is calculated by first multiplying r times d-scale and then rescaling the value so obtained in a manner that provides realistic fadeout of the signal, the rescaling being a function of the value of bels and $\theta$. Following the computation of bels, it is determined if the icon is in an angle of acceptance 159 (see FIG. 5B). If not, left dB and right dB values are now computed using the coefficients stored in the look-up table which was generated at step 120. More specifically, $$dB\_left = MAX(bels + dB\_coef(a+90,0), -90)$$

$$dB\_right = MAX(bels + dBcoef(a+90,1), -90)$$

where:
dB_left = the variable left dB component for the active icon,
dB_right = the variable right dB component for the active icon,
MAX = a function which provides the greater of the two numbers in parenthetical,
a = angular location.

If the icon is within angle of acceptance 159, then mono output signals (left and right gain equal to $-3$ dB below the computed gain) are provided. More specifically, if the icon is located in the angle of acceptance, then:

$$dB\_left = MAX(bels-3, -90), \text{ and}$$

$$dB\_right = MAX(bels-3, -90),$$

where
MAX = a function which provides the greater of the two numbers in parenthetical.
Thus, when an icon is in the angle of acceptance, dB left and dB right are equal, each being 3 dB less than the bels radius value.

At step 160, the left and right dB values, which were computed in step 158, are displayed.

At step 166, mouse 34 is checked to see if it is moving by checking the x, y location values. If it is, then at step 163, a final check is performed to determine if crosspoint matrix 44 should be enabled. If matrix 44 is enabled then, at step 164, a six-bit address is generated; the address represents controllable amplifiers 62 which are assigned to active channels. This address is provided to decoder circuit 60. Decoder circuit 60 then provides enable signals to the DACs associated with the appropriate controllable amplifiers 62.

At step 166, control module 40 checks to confirm that the addressed controllable amplifiers 62 correspond to active channels. If the channels are inactive then at step 168, control module 40 instructs computer 30 to provide a mute signal to the addressed controllable amplifiers 62.

If the channels are active, then, at step 170, a 12-bit data word, which represents right gain, is generated for the right output VCA 194, and a 12-bit data word, which represents left gain, is generated for the left output 194. A unity offset is included in these computations. The unity offset compensates for the offset of individual controllable amplifiers 62. More specifically, $$right\_gain = (offset1 - dB\_right) \times 20,$$

and $$left\_gain = (offset2 - dB\_left) \times 20,$$

where
offset1 = the offset of the right controllable amplifier, and
offset2 = the offset of the left controllable amplifier.
Because VCAs 94 of controllable amplifiers 62 provide a logarithmic output level for a linear input, the left and right input gain signals may be linear.

At step 172, these data words are provided to controllable amplifiers 62. More specifically, DAC 92 of each activated controllable amplifier 62 receives this data word via register circuit 90 and provides a voltage (V DAC) to a respective VCA 94. VCA 94 receives the voltage which is linear and provides an output signal which is the appropriate dB level. DACs 92 provide slew limiting of the control voltage to eliminate control voltage artifacts in the signal output.

At step 174, the mouse coordinates of the active icon are updated, and, at step 176, the entire mix is updated. At step 178, the x and y coordinates are updated and the r and $\theta$ values are stored for the active icon. At step 180, the keyboard is sampled to determine if there was any keyboard activity and at step 182 the mouse is scanned to determine if a constant R or $\theta$ mode is chosen. If so then, at step 184, the data is computed to provide the icon along a constant R path or along a constant $\theta$ radius.

Control module then returns to step 152, and if mouse 34 is activated, repeats the mix for another icon. If mouse 34 is not activated then, at step 186, R and $\theta$ are computed for the mouse location and, at step 188, the keyboard is scanned to determine if any special commands were generated. Special commands may include whether to store the mix and prepare to end the present mix session. If not, then control module 40 returns to sample mouse 34 at step 130. If so, then the special commands are processed at step 190. Control module 40 then checks to see if the ESC key was pressed at step 192. If not, then control module 40 again determines whether any icons are present at step 126. If so, then control module 40 terminates the mix at step 194.

OTHER EMBODIMENTS

Other embodiments of the invention are within the scope of the following claims.

For example, system 10 may be used to mix input signals into greater than two output channels, e.g., a quadraphonic mix environment or a Dolby surround sound mix environment (having left front, center front, right front, and rear outputs), and the visual display could be in three or more dimensions.

Also, the icons could change in appearance (e.g., color, size, brightness) to indicate a change in parameter value (e.g., compression, equalization, grouping).

Additionally, regions may be defined in the multidimensional space, such that movement of an icon to that location will cause automatic generation of a control signal affecting any number of parameters.

This mapping ability of the invention can, e.g., be used in mixing voice and music for film or television. When mixing for film or television, often music is mixed with the narrative to enhance the presentation of the work. The music is often mixed somewhat lower than the narrative when narrative is present and is brought to near full level when there is no narrative, to fill in the gap. It is often necessary to limit the dynamic ranges of the narrative and the music to achieve better intelligibility. The narrative often has compression and limiting employed to contain the dynamic peaks of the announcer while the music is heavily compressed, so that no offending peaks interfere with the voice over and to keep the music from "dropping out" or disappearing in the mix. This compression of the music is made even more necessary if the music has a great dynamic range. When the music level is brought up to full level, in a case where there is no narrative, the excessive compression used for mixing under will be heard, often resulting in music without dynamics and sometimes audible "pumping" from the compressor's inability to deal with the complex waveform. The engineer typically selects a compression ratio that achieves punch when the music is full and contains the music sufficiently when it is mixed under. Unless the engineer has special equipment at his disposal, the compression ratio parameter is not changed during a typical mix because it is too complicated to change that parameter or many parameters dynamically. Tracking a change in the mix of voice and music with a change in a parameter, such as compression ratio, is very difficult, especially if many changes are required.

With the interactive control apparatus according to the invention, the change in compression slope can be mapped into the output space so that simply moving the icon to change gain also outputs control data to an external, dynamically controlled compressor that has its compression slope altered to fit the requirements for the music being full level or being mixed under to accommodate the narrative. In such a case, the compression slope can be adjusted to precisely provide the optimum compression for the music under and music full periods.

Another example for film mixing is the use of mapping templates for each scene of the movie. A template would consist of a 2-D or 3-D "floor plan" of the scene, setup by the engineer. Different areas would be outputted to dynamically control external audio processing devices, e.g., compressors, limiters, equalizers, reverb and delay units. If an icon is placed into any of these regions so mapped, the coordinates of the icon position are used to address data in a look-up table or derived from a function, and the data are outputted dynamically to the external device processing the audio channel represented by the icon. E.g., if the actor were to walk behind an object, the parameters for reverb, early reflection, and equalization could be altered to achieve the effect of someone talking from behind the object. These data outputted are in addition to the gain change to one or more output channels, e.g., based upon the position of the actor. The multiple parameter control data would also be layered, so that an icon placed in a region so mapped, would effect the change of one or more external devices associated with that channel or any other channel. Movement of one sound source could also be programmed to affect another sound source; e.g., if one sound source (associated with the active icon) moves in front of another sound source, the second source could be automatically attenuated even though its icon is not active. Different layers could also be selected or deactivated at will. An extra output bus of the gain matrix could be the source of the signal to the external processing, allowing one or more channels to contribute to the signal sent to an external device, e.g., a reverb unit.

The overall mapping concept could involve primary gain settings to the mix, secondary gain settings (dependent on or independent of the primary gain setting) to feed external processing, and control information for the dynamic alteration of external processing parameters (reverb decay, delay time, compression slope, limiter attack time, limiter release time, etc.).

Figure 7:
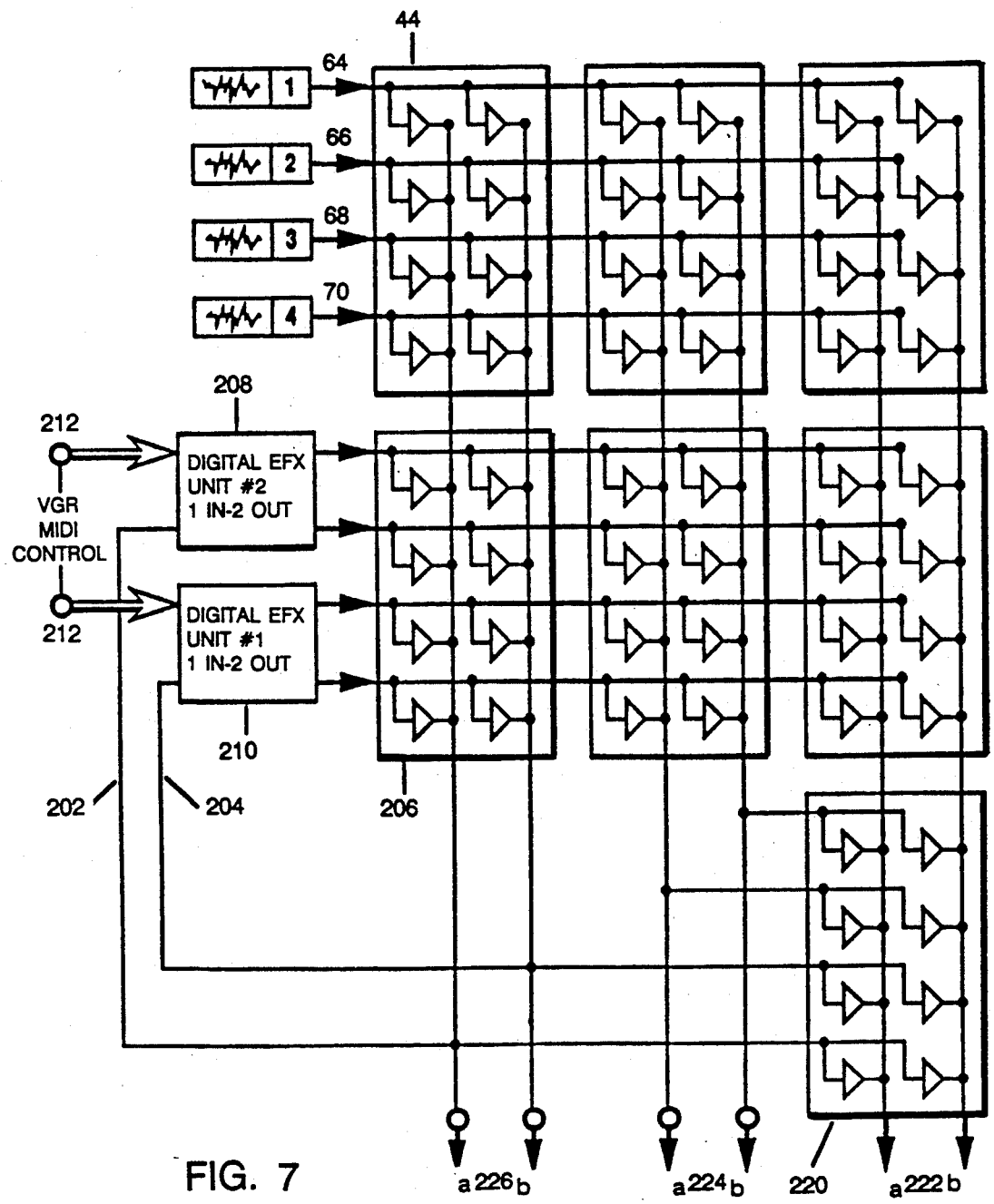
FIG. 7 is a block diagram of an alternative sound signal processing matrix configuration for the FIG. 1 system.

The return from the external processing device could re-enter the gain matrix on another previously unused or additional input channel and also be represented by an icon. As shown in FIG. 7, two output busses 202, 204 from matrix 206 feed signals into two independent audio effects processors 208, 210 that are dynamically reprogrammable via MIDI control line 212.

Output busses 224*a*, 224*b* are for the main mix and are used to feed the recording device or listening apparatus. Busses 226*a*, 226*b* are the effect busses used to provide primary feeding back into processors 208, 210. Module 220 allows monitoring the output of mix busses and effect busses to confirm proper operation.

Due to the universal nature of the variable gain matrix, all input channels can contribute to a main stereo mix while one or more dependent or independent submixes can be outputted to the external effects (reverb, delay, pitch . . . ), as well as monitoring busses (222*a*, 222*b*). Dependent means software simulation of postfade, and independent means software simulation of prefade. Prefade and postfade are terms used on conventional consoles to indicate if a submix is after the main channel fader (dependent) or before the main channel fader (independent). The stereo returns from the external effect devices are re-entered into the variable gain matrix, and can therefore contribute to the main mix or one or more submixes. The software will disallow or mute the various nodes that might contribute to feedback.

With an $M \times N$ variable gain matrix employed, main channel signals as well as effect returns can be uniquely controlled from the interactive controller. The outputs of the matrix could feed recording devices, effect processors, monitoring busses. For instance two busses 222a, 222b could be dedicated as a monitoring buss. Because the buss is easily reconfigurable via software, this monitoring buss could be dynamically reconfigured for stereo "in-place" solo, normal stereo monitoring, group solo, mute in monitor but not in main mix, prefade (independent) listen, etc.

The variable gain matrix in a large enough configuration functions as a universal, dynamically reprogrammable "console" with a graphics front end. Under software control, configurations that must be "hardwired" into a current console, can be simulated via manipulation of the various gains at various matrix nodes.

The system may also be used for theater playback to play back special effects, in recording studios for the main mix or for special mix effects, in television post production for the main mix or for easy repeatable automated stereo mixing to timecode, in live performances to allow the mixing to be remote from the amplifiers (e.g., by using an optical link for busses 16, 17), in pavilions to allow live mixing to the audience from one or more tracks, in radio production rooms where space and versatility are a factor, in mixing sound effects for simulators (e.g., aircraft, space, submarine) or in satellite mix-minus setups to allow easy recall of complicated mixes.

Besides interactive input devices that permit direct interaction with the sound engineer, other sources of controlling information can be used to change the position of icons and appearance, e.g., a completely independent computer drive console, a source of MIDI data, a MIDI sequencer, a source of computer generated data, and an external audio or visual editing system.

```
0 .pl 86
1 .ll 110
2 .n4
3 >he Page #   \D   \T    Copyright Voyager Sound 1985-1990 //  Ver 0.70 // Devitt
4 '
5 IF XBIOS(4)<>1
6   ALERT 1," System must be : in med. rez",1,"ABORT",i%
7   EDIT
8
9 ENDIF
10 vers$="Ver. 0.70 - under developement - 9/28/89"
11 '
12 ' -------------------------------------------------------------
13 '
14 the_head:
15 '
16 IF EXIST("E:*.*")            ! does HARD DISK exist ?
17   port_write!=FALSE          ! disable I/O to Voyager matrix, the final enable
18   develope!=TRUE
19   CHDRIVE "E:\"              ! default to HARD DISK
20   CHDIR "\VOYAGER.GFA\"
21 ELSE
22   port_write!=TRUE
23   develope!=FALSE
24   CHDRIVE "a:\"
25 ENDIF
26 '
27 IF EXIST("vgr_ray.raw") ! if file exists then load
28   SETCOLOR 0,0,0,0
29   SETCOLOR 1,4,4,4
30   SETCOLOR 2,7,7,7
31   SETCOLOR 3,0,7,7
32   BLOAD "vgr_ray.raw",XBIOS(3)
33   REPEAT
34   UNTIL MOUSEK
35   CLS
36 ENDIF
37 '
38 ON BREAK GOSUB abort      ! a simple way out
39 ON ERROR GOSUB whoops     ! if system error
40 ' debug!=TRUE             ! the debug flag
41 '
42 auto_load!=TRUE           ! auto load icons
43 weight!=TRUE              ! weighted mouse during mix ?
44 '
45 @initialize              ! setup storage, get things ready
46 @main_menu(TRUE)         ! setup main menu tree, process whole routine
47 '
48 main_loop:
49 t%=TIMER
50 DEFTEXT 3,16,0,32
51 GRAPHMODE 1
52 TEXT 0,170,630,"Voyager Sound Graphic Mix"
53 COLOR 1
54 vgr_logo(639/2,199-60,1.5,0.75)   ! output lloyds VGR logo
55 DO
```

```
 56   VSYNC
 57   key$=INKEY$              ! sample keyboard
 58   IF TIMER-t%>400
 59     buffer1$=TIME$                    ! get snapshot of time
 60     buffer2$=""                       ! clear buffer
 61     FOR i%=1 TO 8                     ! convert to special characters
 62       buffer3$=MID$(buffer1$,i%,1)
 63       buffer2$=buffer2$+CHR$(ASC(buffer3$)+(32*(buffer3$<>":")))
 64     NEXT i%
 65     DEFTEXT 1,1,0,8
 66     TEXT 538,195,180,buffer2$         ! output the time
 67     t%=TIMER
 68     PRINT tex_color1$;
 69     message("Make Menu Selection...")
 70   ENDIF
 71   '
 72   IF key$=" "        ! clear screen with space bar
 73     CLS
 74     @_colors(1)
 75     @main_menu(FALSE)
 76   ENDIF
 77   '
 78   special_key%=ASC(key$)    ! ^D
 79   IF special_key%=4         ! dump variables to printer
 80     ALERT 2,"Variable Dump to printer",1," YES | NO ",i%
 81     IF i%=1
 82       FOR i%=65 TO 90
 83         DUMP CHR$(i%) TO "PRN:"
 84       NEXT i%
 85       FOR i%=65 TO 90
 86         DUMP "@"+CHR$(i%) TO "PRN:"
 87       NEXT i%
 88       FOR i%=65 TO 90
 89         DUMP ":"+CHR$(i%) TO "PRN:"
 90       NEXT i%
 91     ENDIF
 92   ENDIF
 93   '
 94   IF special_key%=6         ! ^F
 95     ALERT 2,"Variable Dump to files",1," YES | NO ",i%
 96     IF i%=1
 97       message("Dumping...")
 98       DUMP " " TO "var_dump.txt"
 99       DUMP "@" TO "sub_dump.txt"
100       DUMP ":" TO "lab_dump.txt"
101       message("Sorting...")
102       sort_file("var_dump.txt")
103       sort_file("sub_dump.txt")
104       sort_file("lab_dump.txt")
105       message("")
106     ENDIF
107   ENDIF
108   ON MENU
109 LOOP
110 '
111 ' -----------------------------------------------------------------
112 '
113 ' no% = # to increment
114 ' inc% = increment value
115 ' mn% = minimum value
116 ' mx% = maximum value
117 '
118 DEFFN i_inc_limit(no%,inc%,mn%,mx%)=MIN(MAX(no%+inc%,mn%),mx%)   ! integer
119 DEFFN f_inc_limit(no,inc,mn,mx)=MIN(MAX(no+inc,mn),mx)           ! floating
120 ' -----------------------------------------------------------------
121 '
122 PROCEDURE direct       ! handle real time mouse / icon input - for stereo mix
123   CLS
124   screen_buffer_preset(1,mix_screen$)
125   @low_rez(2)       ! to low rez
126   '
127   SPUT mix_screen$
128   '
129   SETMOUSE 155,155
130   key_click(0)           ! turn key-click off
131   ~XBIOS(35,W:0,W:0)     !turn repeat off
```

```
132   STICK 0
133   DO
134
135     IF icon_count%>0
136       @update
137     ENDIF
138     DO
139       key$=INKEY$              ! sample keyboard
140       MOUSE x%,y%,k%
141
142       special_key%=CVI(key$)   ! if special key
143       SELECT special_key%
144       CASE 72   ! up arrow
145         @gain(active_icon%,increment_gain%)
146         SETMOUSE xc%(active_icon%),yc%(active_icon%)
147
148       CASE 80   ! down arrow
149         @gain(active_icon%,-increment_gain%)
150         SETMOUSE xc%(active_icon%),yc%(active_icon%)
151
152       CASE 75      ! left arrow
153         @pan(active_icon%,-increment_pan%)
154         SETMOUSE xc%(active_icon%),yc%(active_icon%)
155
156       CASE 77   ! right arrow
157         @pan(active_icon%,increment_pan%)
158         SETMOUSE xc%(active_icon%),yc%(active_icon%)
159
160       CASE 60   ! F2 key
161         IF mouse_cursor_toggle!
162           STICK 0
163           mouse_cursor_toggle!=FALSE
164           key_click(0)
165         ELSE
166           OUT 4,&HA,50,5                    ! turn on cursor returns with mouse move
167           mouse_cursor_toggle!=TRUE
168           key_click(1)
169         ENDIF
170
171       CASE 98   ! help key
172         IF MOUSEY<y_limit%                  ! select new ramp_adjust level
173           RESTORE ramp_menu_data_00
174           ramp_menu_data_00:
175
176           DATA " Select ramp rate "
177           DATA .1,.25,.5,1,1.5,2,3,5
178           DATA "XXX"
179           pop_menu(198,y_limit%,flag$)      ! pop_menu a procedure call
180
181           IF VAL(flag$)>0
182             ramp_adjust=VAL(flag$)          ! assign new ramp_adjust
183           ENDIF
184         ELSE
185           RESTORE help_menu_data_00
186           help_menu_data_00:
187           DATA "DIRECT MODE FUNCTION KEYS"
188           DATA "F1  - Toggle constant magnitude / angle"
189           DATA "F2  - Toggle mouse direct mode"
190           DATA "F3  -"
191           DATA "F4  -"
192           DATA "F5  - Toggle deactivation of icon"
193           DATA "F6  - Display last event"
194           DATA "F7  - Display next event"
195           DATA "F8  -"
196           DATA "F9  - Overwrite current event"
197           DATA "F10 - Append to event list"
198           DATA "M   - Toggle weighted mouse"
199           DATA "S   - Solo"
200           DATA " "
201           DATA "RETURN - Add Icon To Mix"
202           DATA "SPACE BAR - Lock On Mouse"
203           DATA "    Pan Icon"
204           DATA "    Gain Icon"
205           DATA "XXX"
206           pop_menu(20,y_limit%,flag$)
207         ENDIF
```

```
208
209      CASE 63   ! F5 key deactivate
210        IF active!(active_icon&)
211          active!(active_icon&)=FALSE   ! toggle logic
212          dac_out(active_icon&-1,&HFFF)  ! shut off channel
213          dac_out(active_icon&+3,&HFFF)
214          FOR i&=1 TO icon_count&              ! re-assign active icon
215            IF active!(i&)
216              active_icon&=i&
217            ENDIF
218          NEXT i&
219          update
220        ENDIF
221
222      CASE 67   ! F9 key       OVERWRITE
223        sound_3
224        PAUSE 5
225        sound_3
226        FOR i&=1 TO icon_count&
227          mix_data_xc&(event_show&,i&)=xc&(i&)
228          mix_data_yc&(event_show&,i&)=yc&(i&)   ! i& = icon number
229          mix_data_active!(event_show&,i&)=active!(i&)   ! store active data
230          mix_data_dac(event_number&,i&,0)=db_left(i&)
231          mix_data_dac(event_number&,i&,1)=db_right(i&)
232        NEXT i&
233        mix_data_icon&(event_show&)=active_icon&
234
235      CASE 68   ! F10 key      APPEND
236        sound_3
237        event_number&=MIN(event_number&+1,event_max&)
238        event_show&=event_number&
239        ATEXT event_x&,event_y&,0,STR$(event_show&,3)
240        ATEXT event_x&,event_y&+8,0,STR$(event_show&,3)
241        FOR i&=1 TO icon_count&
242          mix_data_xc&(event_number&,i&)=xc&(i&)
243          mix_data_yc&(event_number&,i&)=yc&(i&)   ! i& = icon number
244          mix_data_active!(event_number&,i&)=active!(i&)   ! store active data
245          mix_data_dac(event_number&,i&,0)=db_left(i&)
246          mix_data_dac(event_number&,i&,1)=db_right(i&)
247        NEXT i&
248        mix_data_icon&(event_number&)=active_icon&
249
250      CASE 65   ! F7 key  INCREMENT SHOW
251        event_show&=MIN(event_show&+1,event_number&)
252        ATEXT event_x&,event_y&,0,STR$(event_show&,3)
253        FOR i&=1 TO icon_count&
254          active!(i&)=mix_data_active!(event_show&,i&)
255          xc&(i&)=mix_data_xc&(event_show&,i&)  ! update temps with data
256          yc&(i&)=mix_data_yc&(event_show&,i&)
257          db_left(i&)=mix_data_dac(event_show&,i&,0)
258          db_right(i&)=mix_data_dac(event_show&,i&,1)
259          channel_out(i&)
260          set_x_y(i&,xc&(i&),yc&(i&))            ! set up and display icon
261        NEXT i&
262        act_upd(mix_data_icon&(event_show&))    ! new active icon
263                 update
264
265      CASE 64   ! F6 key DECREMENT SHOW
266        event_show&=MAX(event_show&-1,1)
267        ATEXT event_x&,event_y&,0,STR$(event_show&,3)
268        FOR i&=1 TO icon_count&
269          active!(i&)=mix_data_active!(event_show&,i&)
270          xc&(i&)=mix_data_xc&(event_show&,i&)  ! update temps with data
271          yc&(i&)=mix_data_yc&(event_show&,i&)
272          db_left(i&)=mix_data_dac(event_show&,i&,0)
273          db_right(i&)=mix_data_dac(event_show&,i&,1)
274          channel_out(i&)
275          set_x_y(i&,xc&(i&),yc&(i&))            ! set up and display icon
276        NEXT i&
277        act_upd(mix_data_icon&(event_show&))    ! new active icon
278                 update
279
280      ENDSELECT
281
282      DEFFN a_key(test$)=(NOT special_key&) AND (UPPER$(key$)=UPPER$(test$))
293
```

```
284     IF @a_key("M")
285       weight!=NOT weight!
286       sound_3
287       IF weight!
288         ATEXT 27,60,0,"MOUSE IS WEIGHTED"
289       ELSE
290         ATEXT 27,60,0,"MOUSE IS NOT WEIGHTED"
291       ENDIF
292     ENDIF
293     '
294     IF @a_key("S")
295       solo
296     ENDIF
297     '
298     IF x&>x_limit&-12              ! set horz. mouse limits, rez change
299       x&=x_limit&-12
300       SETMOUSE x&,y&
301     ENDIF
302     '
303     IF y&<y_limit& AND mouse_toggle1!   ! toggling the mouse
304       DEFMOUSE 0
305       mouse_toggle1!=FALSE
306       mouse_toggle2!=TRUE
307     ENDIF                          ! create a flip / flop state
308     IF y&>y_limit& AND mouse_toggle2!
309       DEFMOUSE mouse$(1)
310       mouse_toggle1!=TRUE
311       mouse_toggle2!=FALSE
312     ENDIF
313     '
314     DO WHILE MOUSEY>15 AND MOUSEY<30 AND MOUSEK  ! ramp output channels
315       SELECT MOUSEK
316       CASE 1
317         ramp_out=@f_inc_limit(ramp_out,ramp_adjust,ramp_low,ramp_high)
318       CASE 2
319         ramp_out=@f_inc_limit(ramp_out,-ramp_adjust,ramp_low,ramp_high)
320       ENDSELECT
321       @vca_gain_set(8,ramp_out)
322       @vca_gain_set(9,ramp_out)
323       ATEXT 192,49,0,STR$(ramp_out,5,1)
324       SHOWM
325       PAUSE ump_delay&
326     LOOP
327     '
328     IF k&=2 AND y&>y_limit&        ! right mouse button activity
329       @icon_select(hit!) ! if right mouse button, select icon
330       IF hit!                      ! if an icon is selected
331         IF old_icon&=active_icon&   ! are we on the same icon ?
332           @old_position
333         ELSE
334           old_icon&=active_icon&
335         ENDIF
336       ENDIF
337       same_icon'=FALSE
338       @screen_write(0)
339     ENDIF
340     '
341     IF key$=CHR$(8)        ! backspace
342       @old_position
343     ENDIF
344     '
345     IF weight!             ! preset moving average
346       pre_weight(x&,y&)
347     ENDIF
348     '
349     key_space!=(key$=" ")  ! setup test for space bar
350     IF (((ox&<>x& OR oy&<>y&) AND (MOUSEX<>x& OR MOUSEY<>y&)) OR k& OR key_space!) AND y&>y_limit&
351       x_old_icon&=xc&(active_icon&)
352       y_old_icon&=yc&(active_icon&)   ! save old coordinates
353       mix_switch1!=TRUE
354       HIDEM
355       WHILE k&=1 OR k&=3 OR key_space!  ! inner mouse loop
356         IF key_space! AND mix_switch1!
357           SETMOUSE ox&,oy&           ! if first time, move mouse to icon
358           pre_weight(ox&,oy&)        ! update weight mouse data
359           mix_switch1!=FALSE
```

```
360         ENDIF
361         IF weight!
362           MOUSE mosx%(5),mosy%(5),k&   ! preset array
363           RCALL weighted%,mosx%()
364           RCALL weighted%,mosy%()      ! call assembly routine
365           x&=mosx%(7)                  ! data back from array
366           y&=mosy%(7)
367         ELSE
368           MOUSE x&,y&,k&
369         ENDIF
370         IF x&>x_limit&               ! impose mouse limits, pseudo low-rez
371           x&=x_limit&
372           SETMOUSE x&,y&
373           pre_weight(x&,y&)
374         ENDIF
375         IF y&<y_limit&               ! set Y mouse limit
376           y&=y_limit&
377           SETMOUSE x&,y&
378           pre_weight(x&,y&)
379         ENDIF
380         @polar(FALSE)                ! call polar conversion
381         @decibels                    ! call decibel conversion
382         IF x&<>ox& OR y&<>oy&
383           ' midi alternate screen here-deleted
384           IF gain_matrix!
385             @channel_out(active_icon&)          ! send to dacs active icon
386           ENDIF
387
388           xc&(active_icon&)=x&
389           yc&(active_icon&)=y&
390           @screen_write(0)                      !re-draw all active icons
391         ENDIF
392         ox&=x&
393         oy&=y&
394         mag&(active_icon&)=r&
395         ang&(active_icon&)=a&        ! update magnitude & angle
396         same_icon!=FALSE
397
398         mix_key1$=INKEY$             ! read the keyboard
399         IF mix_key1$<>""             ! bypass all tests if no character
400           IF mix_key1$=" "              ! end the lock down if space is pressed
401             key_space!=FALSE           ! cancel loop
402             IF solo_logic!
403               solo_off
404             ENDIF
405             key$=" "
406           ENDIF
407
408           IF (mix_key1$>"0") AND (mix_key1$<":")
409             key$=mix_key1$             ! change the icon by numbers
410             IF solo_logic!
411               solo_off
412             ENDIF
413             active
414
415             pre_weight(ox&,oy&)        ! preset weight mouse
416           ENDIF
417
418           IF UPPER$(mix_key1$)="S"
419             IF mix_solo!  ! a little reverse logic
420               solo_off         (
421               mix_solo!=FALSE
422             ELSE
423               solo_on
424               mix_solo!=TRUE
425             ENDIF
426           ENDIF
427
428         ENDIF
429
430       WEND
431
432       IF i_cur! AND (((ABS(SUB(ox&,x&))>delta& OR ABS(SUB(oy&,y&))>delta&)) OR same_icon!)
433         @screen_write(1)            ! re-draw with cursor
434         same_icon!=TRUE
435       ENDIF
```

```
436          @polar(TRUE)
437          SHOWM
438        ENDIF
439        '
440        EXIT IF key$<>""    ! test keyboard once each pass
441        '
442        .
443      LOOP
444      '
445      IF key$=CHR$(13)    ! a carrage return to get new icons
446        @get_icon         ! select icon from menu
447      ENDIF
448      '
449      IF key$>"0" AND key$<":"   ! test for ket limits
450        @active           ! change active icon numerically
451      ENDIF
452      '
453      ' special key is pressed
454      IF special_key&=59 ! F1 function key, toggle constant r or a
455        mag!=NOT mag!
456        IF icon_count&>0
457          SETMOUSE ox&,oy&
458        ENDIF
459      ENDIF        ! end special funtion keys
460      '            other function keys here
461      '
462      EXIT IF ASC(key$)=27 ! escape to main menu
463      '
464    LOOP
465    CLS
466    @med_rez(0)  ! change rez back to medium
467    key_click(1)  ! on
468    ~XBIOS(35,W:20,W:2)     ! restore keyboard repeat
469 RETURN
470 ' --------------------------------------------------------------------
471 PROCEDURE get_num(init&)  ! get a multi-digit number with time out
472    LOCAL t%
473    n&=init&
474    t%=TIMER    ! setup time out
475    REPEAT
476      REPEAT
477        a$=INKEY$
478      UNTIL LEN(a$) OR MOUSEK OR TIMER-t%>delay&
479      n&=10*n&+VAL(a$)
480    UNTIL a$<"0" OR a$>"9" OR MOUSEK OR TIMER-t%>delay&
481    n&=n&/10
482    a$=""
483 RETURN
484 ' --------------------------------------------------------------------
485 PROCEDURE load_screen(b$,pal!)
486    IF NOT auto_load!
487      FILESELECT "\*.PI1",b$,file$
488      IF file$=""
489        GOTO never_mind  ! abort file load
490      ENDIF
491    ELSE
492      '..
493    ENDIF
494    BLOAD file$,XBIOS(3)-34        ! load into screen, minus pallette bias
495    '
496    ' now update pallette
497    '
498    pointer%=XBIOS(3)-32
499    IF pal!
500      FOR i&=0 TO 15
501        z%=DPEEK(pointer%+(i&*2))  ! save for low rez
502        SETCOLOR i&,z%
503      NEXT i&
504      @save_palette(2)              f
505    ENDIF
506    never_mind:
507 RETURN
508 ' --------------------------------------------------------------------
509 PROCEDURE polar(polario!)     ! compute polar coordinates and display
510    yr=MAX(SUB(ygraph_offset&,y&)*scale,0) ! set negative limit
511    xr=SUB(x&,xgraph_offset&)      ! convert to floating point
```

```
512    IF (MOUSEK=3 AND NOT mag!)           ! for constant angle
513      xr=MAX(MIN(yr*TAN(last_a&*ator),150!),-150)      ! re-compute (x,y) given angle
514      x&=ADD(xr,xgraph_offset&)         ! set a limit
515      SETMOUSE x&,y&
516    ELSE
517      last_a&=a&
518    ENDIF
519    IF (MOUSEK=3 AND mag!)              ! re-compute for constant magnitude
520      i=MUL(last_r&,last_r&)-xr*xr
521      IF i<0                            ! check for lower limit
522        yr=0                            ! use floating point
523        xr=last_xr
524        x&=ADD(xr,xgraph_offset&)
525      ELSE
526        last_xr=xr
527        yr=SQR(i)/scale                 ! floating point   (/ by scale old version)
528      ENDIF
529      y&=ygraph_offset&-yr              ! floating
530      SETMOUSE x&,y&
531    ELSE
532      last_r&=r&
533    ENDIF
534    r&=SQR(xr*xr+yr*yr)    ! compute magnitude
535    IF yr==0                             ! compute anglecolor 1,7,7,7
536      a&=90*SGN(xr)
537    ELSE
538      a&=ATN(xr/yr)*rtoa
539    ENDIF
540    IF polario!           ! are we in inner loop ?
541      bels=-ROUND(r&*d_scale,2)    ! compute db for display
542      non_linear(a&,bels)    ! re-scale db
543      bels=bels+(3*(bels<=90))
544      ATEXT 0,1,0,"db="+STR$(bels,5,1)+"  i="+STR$(a&,3) ! output db and angle
545      polarsw1!=TRUE              ! onetime output of blanking sting
546    ENDIF
547    IF (NOT polario!) AND polarsw1!
548      ATEXT 0,1,0,SPACE$(20)
549      polarsw1!=FALSE             ! one time blank, toggle the switch
550    ENDIF
551    IF debug!
552      PRINT tex_color2$;          ! set output color
553      PRINT AT(13,2);USING "(r=### :=###)",r&,a&;
554      PRINT AT(13,1);USING "(x=### y=###)",x&,y&;
555    ENDIF
556 RETURN
557 ' ------------------------------------------------------------------
558 PROCEDURE update         ! graphically update the entire mix screen
559   ~XBIOS(5,L:s_buffer_a%,L:-1,W:-1)  ! use temporary buffer
560   SPUT mix_screen$
561   ox&=xc&(active_icon&)
562   oy&=yc&(active_icon&)
563   x&=ox&
564   y&=oy&
565          update last R & A  value for constant r & theta in polar
566   last_r&=mag&(active_icon&)
567   last_a&=ang&(active_icon&)
568   r&=last_r&
569   a&=last_a&
570   @polar(TRUE)
571   GRAPHMODE 1
572   DEFTEXT txt_color&,0,0,4
573   IF mag!           ! output status of constant R or A flag
574     TEXT 80,50,-107,"CONSTANT MAGNITUDE"
575   ELSE
576     TEXT 80,50,-107,"CONSTANT ANGLE"
577   ENDIF
578   IF mouse_cursor_toggle!
579     TEXT 80,50,-107,"MOUSE - GAIN & PAN"
580   ENDIF
581   IF solo_logic!
582     ATEXT 27,60,0,"SOLO ENGAGED"
583   ENDIF
584   ATEXT 192,49,0,STR$(ramp_cut,5,1)
585   ATEXT event_x&,event_y&,0,STR$(event_show&,3)
586   ATEXT event_x&,event_y&+8,0,STR$(event_number&,3)
587   @dis_active_icon ! output active icon
```

```
588    @decibels
589    BMOVE s_buffer_a%,screen_base%,redraw%  ' move part of the pre-built screen
590    FOR i&=1 TO icon_count&
591      IF active!(i&)
592        PUT xc&(i&)-x_bias&(i&),yc&(i&)-y_bias&(i&),icons$(i&),6
593      ENDIF
594      IF solo_logic!
595        IF active!(i&)
596          PUT xc&(i&)-x_bias&(i&),yc&(i&)-y_bias&(i&),icons$(i&),8
597        ELSE
598          PUT xc&(i&)-x_bias&(i&),yc&(i&)-y_bias&(i&),icons$(i&),6
599        ENDIF
600      ENDIF
601    NEXT i&
602    BMOVE re_buffer%,re_screen%,re_bytes%  ! copy off rest of buffer to main screen
603    ~XBIOS(5,L:screen_base%,L:-1,W:-1)  ! back to main screen
604    DEFMOUSE mouse$(1)
605    '
606    FOR i&=1 TO icon_count&                 ! reset all the DACS
607      @channel_out(i&)
608    NEXT i&
609    RETURN
610    ' ----------------------------------------------------------------
611    PROCEDURE initialize    ! main initialization of system
612      @_colors(1)
613      PRINT "Initializing, please wait ..."
614      icon$="+"               ! initialize for tighter interpreter loops
615      x&=0
616      y&=0           ! primary mouse I/O variables
617      x_o&=0
618      y_o&=0         ! old bias
619      x_x&=0
620      y_y&=0         ! new bias
621      ox&=0
622      oy&=0          ! old icon / mouse coordinates
623      x_b&=0
624      y_b&=0         ! active icon screen bias
625      xc_err&=4
626      yc_err&=4      ! mouse / icon target error in pixels for capture
627      xr=0
628      yr=0           ! active icon relative coordinates
629      r&=0           ! magnitude of active icon
630      a&=0           ! angle of active icon
631      i&=0
632      mag!=FALSE
633      scale=1.15   ! scaling factor for y versus x / used for graphics
634      x_limit&=319
635      y_limit&=57    ! limits for mouse in direct mode
636      mag_limit&=160 ! limit for graphic magnitude
637      max_main_bar&=110  ! size of main menu string array
638      d_scale=0.1875       ! scaling for decibels on graph
639      non_linear=0.018            ! value for non-linear scaling of fade
640      non_limit=-29+3            ! limit for non_linear fade
641      mono&=5            ! mono radius
642      mono_angle&=7     ! angle for mono lock on
643      '
644      OPTION BASE 0
645      '
646      icon_max&=4                 ! maximum number of icons / mix, low for now
647      '
648      DIM xc&(icon_max&),yc&(icon_max&),icons$(icon_max&),x_bias&(icon_max&),y_bias&(icon_max&)
649      DIM mag&(icon_max&),ang&(icon_max&),active!(icon_max&)
650      '
651      DIM decibels(icon_max&),db_left(icon_max&),db_right(icon_max&)
652      DIM gain_left&(icon_max&),gain_right&(icon_max&)  ! dac settings for channels
653      DIM solo!(icon_max&)  ! solo storage
654      '
655      DIM inactive$(40)       ! main menu inactive list
656      DIM main_bar$(max_main_bar&)   ! the main menu
657      DIM palette%(16,4)      ! to hold system palette, + all others
658      DIM icon_screen$(2)     ! number of icon screens in memory
659      DIM mouse$(7)           ! space for alternate mouse forms
660      DIM check_main!(max_main_bar&)
661      DIM inactive_main!(max_main_bar&) ! is the indexed item inactive ?
662      '
663      event_max&=50     ! total number of events to store
```

```
664  DIM mix_data_xc&(event_max&,icon_max&)  ! setup preset storage
665  DIM mix_data_yc&(event_max&,icon_max&)
666  DIM mix_data_active!(event_max&,icon_max&)  ! active storage
667  DIM mix_data_icon&(event_max&)          ! active icon for event
668  DIM mix_data_dac(event_max&,icon_max&,1)  ! for DAC update *floating*
669  event_number&=0       ! preset event number
670  event_show&=event_number&
671  event_x&=285
672  event_y&=19           ! where to write event numbers
673  '
674  '
675  DIM icon_name$(icon_max&)  ! setup icon_naming storage
676  RESTORE icon_name_00x
677  FOR i&=1 TO icon_max&
678    READ icon_name$(i&)
679  NEXT i&
680  icon_name_00x:
681  DATA Icon number 1,This is icon 2,icon 3,(4) icon (4)
682  '
683  ' Screen Buffer Stuff
684  screen_base%=XBIOS(2)              ! save startup screen address
685  DIM s_buffer!(32000+600)           ! set asside screen worth "BYTES" - room to breathe
686  s_buffer_a%=(VARPTR(s_buffer!(0))+&H200) AND &HFFFF00  ! corrected pointer to array
687  redraw%=160*57                     ! number of bytes not redrawn in direct mode
688  re_buffer%=s_buffer_a%+redraw%    ! compute buffer send address
689  re_screen%=screen_base%+redraw%   ! compute screen receive address
690  re_bytes%=32000-redraw%           ! compute # of bytes to xfer
691  '
692  output_channels&=2                 ! # of output channels in system
693  DIM dac_offset&(icon_max&*output_channels&+1)  ! offset needed to set DAC to unity
694  RESTORE dac_offsets_label
695  FOR i&=0 TO icon_max&*2+1          ! read them in to offset array
696    READ buffer1$
697    dac_offset&(i&)=VAL("&h"+buffer1$)
698  NEXT i&
699  dac_offsets_label:
700  DATA 7f9,7fa,7ff,7fd,7fe,7fe,7fd,7fc,7ff,7fc
701  ' the above values obtain from calibration of matrix
702  dac_mute&=&HFFFF      ! absolute to DAC for mute
703  '
704  '      Assembly routine to calculate weighted mouse
705  DIM mosx%(16),mosy%(16)
706  '
707  INLINE weighted%,46
708  '
709  INLINE dolby_icon%,400
710  '
711  icon_count&=0           ! number of icons actually in mix
712  active_icon&=1          ! first active icon = 1
713  rtoa=180/PI             ! radian to angle conversion, floating point
714  ator=PI/180             ! angle to radian conversion, floating point
715  delay&=200*(0.4)        ! set time delay in seconds, with 200hz clock
716  icon_scr&=1             ! icon screen index
717  num_color&=3            ! color for numeric insert into icon
718  txt_color&=3            ! color for text on mix screen
719  grez&=XBIOS(4)          ! get current resolution
720  midi_timeout&=200*(1)   ! time out in seconds for no midi communication
721  midi&=3                 ! the atari midi port #
722  gain_matrix!=FALSE      ! I/O enable within direct loop, port_write! is final say
723  mouse_toggle1!=TRUE
724  mouse_toggle2!=FALSE    ! preset the mouse flip/flop status
725  increment_pan&=10       ! pan increment
726  increment_gain&=3       ! gain increment
727  xgraph_offset&=161      ! x graphic offset for stereo mix
728  ygraph_offset&=190      ! y graphic offset for stereo mix
729  '
730  '               ALL VALUES IN DB
731  ramp_adjust=0.5         ! value for ramping output DACS
732  ramp_out=0              ! value in DB for output ramp function
733  ramp_high=0             ! high limit for ramp           *FLOATING*
734  ramp_low=-90            ! low limit for output channel ramp
735  ramp_delay&=0           ! delay introduced in ramp function
736  '
737  db_high=12              ! high gain for VCA,s in decibels *FLOATING*
738  db_low=-102             ! low gain for VCA used by VCA_GAIN_SET
739  '
```

```
740 '
741     LET write_address%=&HFB0000      ! address for write
742     LET read_address%=&HFB0100       ! address for read
743     brd-d%=0                         ! board #  0 for now
744 '
745     DIM db_coef(180,1)                     ! coefficients for DB vs. ang.
746     FOR i&=-90 TO 90
747        db_coef(i&+90,0)=20*LOG10(MAX(SINQ((90-i&)/2),0.001))    ! left db coefficient
748        db_coef(i&+90,1)=20*LOG10(MAX(COSQ((90-i&)/2),0.001))    ! right coefficient
749     NEXT i&
750     db_coef(0,1)=-60  ! right -90 deg.
751     db_coef(1,1)=-56
752     db_coef(2,1)=-50
753     db_coef(3,1)=-40
754     db_coef(177,0)=-40     ! left at +90 deg.
755     db_coef(178,0)=-50
756     db_coef(179,0)=-56
757     db_coef(180,0)=-60
758
759 '    db_right(active_icon&)=bels+20*LOG10(MAX(SINQ(SUB(90,(DIV(SUB(90,a&),2)))),0.001))
760 '    db_left(active_icon&)=bels+20*LOG10(MAX(SINQ(DIV(SUB(90,a&),2)),0.001))   ! compute based on table lo
        okup
761 '
762     LET data_address_mask%=&X111111   ! P0 (D0-D5)  6 bits of address for VCA #
763     LET data_clk_mask%=&X1000000      ! P0 (D6)     data clock
764     LET data_mclk_mask%=&X10000000    ! P0 (D7)     master clock
765
766     LET data_low_mask%=&X11111111     ! P1 (D0-D7)  lower 8 bits
767     LET data_high_mask%=&X1111        ! P2 (D0-D3)  upper 4 bits
768     LET data_latch2_mask%=&X10000000  ! P2 (D7)     enable to latch #2
769
770     delta&=15                         ! amount cursor can wander before display update
771
772     tex_color1$=CHR$(27)+"b"+CHR$(1)
773     tex_color2$=CHR$(27)+"b"+CHR$(2)                  ! color for direct output
774     tex_color3$=CHR$(27)+"b"+CHR$(3)
775     back_color$=CHR$(27)+"c"+CHR$(0)
776     inverseon$=CHR$(27)+"p"
777     inverseoff$=CHR$(27)+"q"
778
779     PRINT back_color$;inverseoff$;            ! inverse video off
780
781     @reset
782     @save_palette(1)     ! save current palette in position 1, med rez
783
784 '   setup physical screen in screen buffer area
785
786     ~XBIOS(5,L:s_buffer_a%,L:-1,W:-1) ! setup temporary screen memory
787     @load_screen("voyager.PI1",TRUE)  ! get background screen
788     SGET mix_screen$
789     @load_screen("icons1.PI1",FALSE)   ! get icons
790     SGET icon_screen$(1)               ! save 1st icon screen
791     @load_screen("icons2.PI1",FALSE)   ! get icons
792     SGET icon_screen$(2)               ! save 1st icon screen
793     ~XBIOS(5,L:screen_base%,L:-1,W:-1) ! main screen as physical
794
795     @med_rez(0)   ! back to medium
796     auto_load!=FALSE
797     @custom1(1)                        ! define custom icon
798     key_click(1)
799     STICK 0
800     DEFMOUSE 0     ! arrow
801     CLOSEW 0
802
803 ' This code initialzes the I/O and presets the DACS to MUTE
804     @ports_setup        ! setup 3 8-bit ports for write, port_write! must be set
805     FOR i&=0 TO 9       ! all 10 DACS to OFF
806        @dac_out(i&,&HFFF)
807     NEXT i&
808     vca_gain_set(8,ramp_out)
809     vca_gain_set(9,ramp_out)   ! preset dac's to ram_out db.
810
811     draw_voyager
812     memory%=FRE(0)
813     PRINT AT(53,23);"Free Bytes = ";memory%;
814     PRINT AT(1,1);tex_color1$;"Press mouse to engage...";
```

```
815  REPEAT
816    UNTIL MOUSEK
817  RETURN
818  '-------------------------------------------------------------------
819  PROCEDURE get_icon         ! get graphical icon, user select
820    LOCAL asgx&,asgy&
821    asgx&=0
822    asgy&=194
823    try_again:
824    '
825    SPUT icon_screen$(icon_scr&)
826    '
827    SHOWM
828    DEFMOUSE 5
829    IF icon_count&=icon_max&      ! you tried to exceed memory ?
830      CLS
831      @med_rez(0)
832      @sound_1
833      ALERT 1,"Maximum of "+STR$(icon_max&,2)+" icons,!that is the current!hardware limitation.   Sorry.
             1,"RETURN",x1&
834      @low_rez(2)
835      SETMOUSE xc&(active_icon&),yc&(active_icon&)
836      GOTO ret_icon
837    ENDIF
838    IF icon_count&>icon_max&       ! systemerror ?
839      CLS
840      @med_rez(0)
841      CLS
842      @sound_1
843      ALERT 1,"System error, ICON MAX",1,"Abort",x1&
844      END
845    ENDIF
846    ATEXT asgx&,asgy&,0,"Set upper left icon coordinates"
847    REPEAT                  ! wait for left mouse button and toggle icon screens
848      a$=INKEY$
849      IF MOUSEK AND 2
850        icon_scr&=(icon_scr& MOD 2)+1
851        SPUT icon_screen$(icon_scr&)
852        ATEXT asgx&,asgy&,0,"Set upper left icon coordinates"
853        PAUSE 10
854      ENDIF
855      '
856      IF ASC(RIGHT$(a$))=60      ! f2 function key to toggle boxes
857        i_box!=NOT i_box!
858        check_main!(outline&)=i_box!    ! set checkmark flag
859        IF i_box!
860          status$="ON"
861        ELSE
862          status$="OFF"
863        ENDIF
864        PRINT AT(1,1);USING "outline \.\",status$
865        PAUSE 20
866      ENDIF
867      '
868      IF ASC(RIGHT$(a$))=61      ! f3 funtion key to toggle number graphic
869        i_num!=NOT i_num!
870        check_main!(sequence&)=i_num!   ! set checkmark flag
871        IF i_num!
872          status$="ON"
873        ELSE
874          status$="OFF"
875        ENDIF
876        PRINT AT(14,1);USING "sequence \.\",status$
877        PAUSE 20
878      ENDIF
879      '
880      IF ASC(RIGHT$(a$))=62      ! f4 funtion key to toggle number graphic
881        i_dot!=NOT i_dot!
882        check_main!(centroid&)=i_num!   ! set checkmark flag
883        IF i_dot!
884          status$="ON"
885        ELSE
886          status$="OFF"
887        ENDIF
888        PRINT AT(27,1);USING "centroid \.\",status$
889        PAUSE 20
```

```
890     ENDIF
891   '
892   UNTIL MOUSEK AND 1   ! get upper left coordinate
893   ATEXT msgx&,msgy&,0,"Set lower right icon coordinates"
894   x1&=MOUSEX
895   y1&=MOUSEY
896   PAUSE 10
897   GRAPHMODE 3      ! xor
898   DEFLINE 1,2,2,2
899   DO
900     MOUSE x_temp&,y_temp&,k&
901     IF x_temp&<x1& OR y_temp&<y1&
902       x_temp&=x1&
903       y_temp&=y1&
904       &sound 1
905       SETMOUSE x1&,y1&
906     ELSE
907       VSYNC
908       BOX x1&,y1&,x_temp&,y_temp&
909       VSYNC
910       BOX x1&,y1&,x_temp&,y_temp&
911     ENDIF
912     EXIT IF k&      ! set lower right coordinate
913   LOOP
914   IF k&=2
915     PAUSE 10
916     GOTO try_again
917   ENDIF
918   x2&=x_temp&
919   y2&=y_temp&
920   INC icon_count&
921   GET x1&,y1&,x2&,y2&,icon$    ! temporary save of icon field
922   CLS
923   PUT x1&,y1&,icon$,3          ! laydown icon
924   IF i_num!
925     GRAPHMODE 1
926     DEFTEXT num_color&,0,0,4
927     IF icon_count&>9            ! wow, a 2 digit number
928       TEXT x2&-6,y2&-1,RIGHT$(STR$(icon_count&),2)
929     ELSE
930       TEXT x2&,y2&-1,RIGHT$(STR$(icon_count&))
931     ENDIF
932   ENDIF
933   IF i_box!                    ! if flagged outline icon in box
934     GRAPHMODE 1
935     DEFLINE 1,1,0,0
936     COLOR 15
937     BOX x1&,y1&,x2&+6,y2&
938   ENDIF
939   '
940   active_icon&=icon_count&       ! update active icon from icon count
941   '
942   ' compute centroid dot
943   x_b&=(x2&-x1&)/2
944   y_b&=(y2&-y1&)/2              ! into temp variables
945   x_bias&(active_icon&)=x_b&
946   y_bias&(active_icon&)=y_b&    ! compute screen write bias
947   '
948   IF i_dot!                     ! laydown centroid dot
949     GRAPHMODE 1
950     DEFLINE 1,1,0,0
951     IF POINT(x1&+x_b&,y1&+y_b&)
952       COLOR 1
953     ELSE
954       COLOR 1            !color for dot plot
955     ENDIF
956     xp&=x1&+x_b&               !temp
957     yp&=y1&+y_b&
958     PLOT xp&-1,yp&-1
959     PLOT xp&,yp&
960     PLOT xp&,yp&-1             ! four dots
961     PLOT xp&-1,yp&
962   ENDIF
963   '
964   GET x1&,y1&,x2&+6,y2&+6,icon$
965   '
```

```
966    icons$(icon_count&)=icon$
967    active!(active_icon&)=TRUE      ! set icon as active
968    xc&(active_icon&)=159           ! preset icon coordinates
969    yc&(active_icon&)=58+y_b&
970    SETMOUSE xc&(active_icon&),yc&(active_icon&)  ! preset mouse
971    PAUSE 10
972    ret_icon:
973    SPUT mix_screen$
974 RETURN
975 ' --------------------------------------------------------------------
976 PROCEDURE active            ! select currently existing icon from keyboard
977    num&=VAL(key$)
978    @get_num(num&)
979    num&=n&
980    IF num&<1 OR num&>icon_count&
981      ATEXT 0,1,0,"ERROR - No icon with number "+STR$(num&,2)
982      @sound_2
983      @sound_2
984      sound_2
985      ATEXT 0,1,0,SPACE$(30)
986    ELSE
987      active!(num&)=TRUE   ! set active logic
988      @act_upd(num&)
989      DEFMOUSE 0
990      @sound_3
991      DEFMOUSE mouse$(1)
992    ENDIF
993 RETURN
994 ' --------------------------------------------------------------------
995 PROCEDURE act_upd(num&)    ! update active icon temporary status
996    active_icon&=num&
997    icon$=icons$(active_icon&)    ! transfer to active icon temporary
998    ox&=xc&(active_icon&)
999    oy&=yc&(active_icon&)
1000   x_b&=x_bias&(active_icon&)   ! xfer to temp variable
1001   y_b&=y_bias&(active_icon&)
1002
1003   @dis_active_icon
1004   @decibels
1005 '
1006   IF alt_scr!                ! if MIDI xfer on
1007     @packet_out(1,num&,mag&(num&),ang&(num&)+90)  ! output to display #2
1008   ENDIF
1009
1010   SETMOUSE ox&,oy&
1011   same_icon!=FALSE
1012 RETURN
1013 ' --------------------------------------------------------------------
1014 > PROCEDURE sound_1         ! a sound blip for errors
1020 ' --------------------------------------------------------------------
1021 > PROCEDURE sound_2
1025 ' --------------------------------------------------------------------
1026 > PROCEDURE sound_3
1030 ' --------------------------------------------------------------------
1031 > PROCEDURE sound_4
1036 ' --------------------------------------------------------------------
1037 PROCEDURE main_menu(menu_init!)
1038   IF menu_init!
1039
1040     ARRAYFILL check_main!(),FALSE
1041     ARRAYFILL inactive_main!(),FALSE   ! preset the logical arrays
1042
1043     RESTORE the_bar
1044     FOR i&=0 TO max_main_bar&
1045       READ main_bar$(i&)
1046       EXIT IF main_bar$(i&)="***"
1047     NEXT i&
1048     main_bar$(i&)=""
1049     main_bar$(i&+1)=""
1050
1051     the_bar:
1052     DATA " DESK "," ? Voyager Sound"
1053     DATA "--------------------"
1054     DATA 1,2,3,4,5,6,""
1055     DATA " FILE "," load "," save "," default drive "," merge "," disk space "," directory "," reset ","-
               --------------"," quit ",""
```

```
1056    DATA " FIELD "," stereo "," ? Dolby "," quad "," mix-minus "," script "," tables "," icons ",""
1057    DATA " MIX MODE"," direct "," learn "," play "," edit ",""
1058    DATA " REFERENCE "," sapte DF "," sapte NDF "," midi "," internal "," step ",""
1059    DATA " OPTIONS "," cursor "," outline "," sequence "," centroid "," gain matrix "," alt_screen ",""
1060    DATA " HELP "," general "," file "," set "," mix "," time ",""
1061    DATA "***"
1062    '
1063    '
1064    RESTORE inactive_list
1065    FOR j&=0 TO 30
1066      READ inactive$(j&)
1067      EXIT IF inactive$(j&)="***"
1068    NEXT j&
1069    '
1070    inactive_list:
1071    DATA " merge "," quad "," script "," learn "," play "," edit "
1072    DATA " sapte DF "," sapte NDF "," midi "," drop "," mix-minus "
1073    DATA "***"
1074    bar_count&=i&-1
1075    inactive_count&=j&-1    ! hold for later
1076    '
1077    '
1078    FOR m&=0 TO bar_count&              ! set flags for inactive entries
1079      FOR k&=0 TO inactive_count&
1080        IF inactive$(k&)=main_bar$(m&)  ! note string compare
1081          inactive_main!(m&)=TRUE       ! set inactive flag
1082        ENDIF
1083      NEXT k&
1084    NEXT m&
1085    '
1086    '
1087    ' check for specific menu items and load flag arrays
1088    '
1089    FOR m&=0 TO bar_count&
1090      IF " outline "=main_bar$(m&)
1091        outline&=m&                     ! set outline index
1092      ENDIF
1093    '
1094      IF " sequence "=main_bar$(m&)
1095        LET sequence&=m&                ! set sequence index
1096      ENDIF
1097    '
1098      IF " centroid "=main_bar$(m&)
1099        LET centroid&=m&                ! set centroid index
1100      ENDIF
1101    '
1102      IF " alt_screen "=main_bar$(m&)
1103        LET alt_screen&=m&              ! set alt_screen index
1104      ENDIF
1105    '
1106      IF " gain matrix "=main_bar$(m&)
1107        LET gain_matrix&=m&
1108      ENDIF
1109    '
1110      IF " cursor "=main_bar$(m&)
1111        LET cursor&=m&
1112      ENDIF
1113    NEXT m&
1114    '
1115    i_cur!=FALSE
1116    check_main!(cursor&)=i_cur!
1117    i_num!=TRUE
1118    check_main!(sequence&)=i_num!
1119    i_dot!=TRUE
1120    check_main!(centroid&)=i_dot!
1121    i_box!=FALSE
1122    check_main!(outline&)=i_box!
1123    '
1124 ENDIF
1125    '
1126    ' the below code only during re-instate main menu
1127    '
1128 CLS
1129 MENU main_bar$()
1130    '
1131 FOR k&=0 TO bar_count&    ! test flags for inactive entry and set
```

```
1132     IF inactive_main!(k&)
1133        MENU k&,2            ! set to inactive
1134     ENDIF
1135     '
1136     IF check_main!(k&)
1137        MENU k&,1            ! set checkmark
1138     ENDIF
1139   NEXT k&
1140   '
1141   ON MENU GOSUB main_select
1142   COLOR 3
1143   vgr_logo(639/2,199-60,1.5,0.75)   ! output lloyds V6R logo
1144 RETURN
1145 ' -----------------------------------------------------------------
1146 PROCEDURE abort            ! handle user aborts
1147   @sound_1
1148   @med_rez(0)               ! back to medium, preset palette
1149   CLOSE #1
1150   CLOSE #0
1151   CLOSEW 0
1152   MENU KILL
1153   SHOWM
1154   key_click(1)
1155   ~XBIOS(35,20,2)     ! restore keyboard repeat
1156   STICK 0
1157   EDIT
1158 RETURN
1159 ' -----------------------------------------------------------------
1160 PROCEDURE whoops           ! handle system errors, fatal & non
1161   SHOWM
1162   '
1163   @med_rez(0)               ! set to medium rez
1164   ~XBIOS(5,L:screen_base%,L:screen_base%,W:-1) ! get back to reference screen
1165   CLOSE #1
1166   CLOSE #2
1167   CLOSEW 0               ! reset system normal screen display
1168   CLS
1169   PRINT "Error # ";ERR
1170   GRAPHMODE 4
1171   DEFTEXT 2,1,0,32
1172   TEXT 40,50,300,"Non-Fatal Error."
1173   GRAPHMODE 1
1174   PRINT AT(1,23);tex_color13;"Will ask ?      fter alert.";
1175   @sound_1
1176   ~FORM_ALERT(1,ERR$(ERR))   ! let the user know,   wait
1177   ALERT 2,"Do you want to abort",1," YES | NO ",i&
1178   IF i&=1 OR FATAL
1179      abort
1180   ENDIF
1181   ON ERROR GOSUB whoops     ! reset for error processing
1182   DELAY 1
1183   @main_menu(TRUE)
1184   DEFMOUSE 0
1185   key_click(1)              ! click on
1186   STICK 0                   ! reset to mouse ON
1187   RESUME main_loop          ! go back to main wait loop
1188 RETURN
1189 ' -----------------------------------------------------------------
1190 PROCEDURE icon_select(VAR hit!)  ! routine to select active icon from mouse I/O
1191   i&=1
1192   hit!=FALSE
1193   REPEAT
1194     IF ABS(x&-xc&(i&))<xc_err& AND ABS(y&-yc&(i&))<yc_err& AND active!(i&)
1195        @act_upd(i&)   ! call routine to update temp status
1196        i&=icon_max&
1197        DEFMOUSE 0
1198        @sound_3
1199        hit!=TRUE
1200     ENDIF
1201     INC i&
1202   UNTIL i&>icon_max&
1203   DEFMOUSE mouse$(1)
1204 RETURN
1205 ' -----------------------------------------------------------------
1206 PROCEDURE draw_voyager
1207   x_graph&=100
```

```
1288    y_graph&=70
1289    SETCOLOR 0,0,0,0
1210    CLS
1211    GRAPHMODE 1
1212    DEFTEXT 1,9,0,32
1213    TEXT x_graph&,y_graph&,350,"Voyager Sound Inc."
1214    DEFTEXT 3,9,0,13
1215    TEXT x_graph&+4,y_graph&+30,250,"Icon Mix System"
1216    DEFTEXT 2,0,0,13
1217    TEXT 10,y_graph&+100,0,ver$
1218    DEFTEXT 2,0,0,13
1219    TEXT 10,y_graph&+120,0,"= Voyager Sound 1986, 1987, 1988"
1220 RETURN
1221 ' --------------------------------------------------------------
1222 PROCEDURE save_palette(z&)    ! routine to save current palette
1223    FOR i&=0 TO 15
1224      palette%(i&,z&)=XBIOS(7,i&,-1)
1225    NEXT i&
1226 RETURN
1227 ' --------------------------------------------------------------
1228 PROCEDURE restore_palette(z&)    ! routine to restore palette
1229    FOR i&=0 TO 15
1230      VOID XBIOS(7,i&,palette%(i&,z&))
1231    NEXT i&
1232 RETURN
1233 ' --------------------------------------------------------------
1234 > PROCEDURE micro_draw
1320 ' --------------------------------------------------------------
1321 PROCEDURE getnum
1322    x&=0
1323    REPEAT
1324      REPEAT
1325        a$=INKEY$
1326      UNTIL LEN(a$) OR MOUSEK
1327      x&=10*x&+VAL(a$)
1328    UNTIL a$<"0" OR a$>"9" OR MOUSEK
1329    x&=TRUNC(x/10)
1330    a$=""
1331 RETURN
1332 ' --------------------------------------------------------------
1333 > PROCEDURE help_draw
1361 ' --------------------------------------------------------------
1362 PROCEDURE main_select
1363    p&=MENU(0)
1364    MENU KILL      !  turn off the menu system for now
1365    '
1366    IF main_bar$(p&)=" stereo "
1367      @direct
1368      DEFMOUSE 0
1369    ENDIF
1370    '
1371    IF main_bar$(p&)=" ? Dolby "  !    Dolby surround sound
1372      dolby
1373      DEFMOUSE 0
1374    ENDIF
1375    '
1376    IF main_bar$(p&)=" quit "
1377      @sed_rez(0)
1378      CLS
1379      @sound_1
1380      ALERT 2,"Do you really want to quit ?",1," No | Yes ",i&
1381      IF i&=2
1382        @sound_1
1383        CLOSE #1
1384        CLOSE #2
1385        CLOSEW 0
1386        MENU KILL
1387        SHOWM
1388        IF NOT develop!
1389          RESERVE            ! release memory
1390        ENDIF
1391        key_click(1)         ! click ON
1392        ~XBIOS(35,28,2)      ! restore keyboard repeat
1393        STICK 0              ! mouse ON
1394        EDIT
1395      ENDIF
```

```
1396  ENDIF
1397  '
1398  IF main_bar$(p%)=" ? Voyager Sound"
1399    ALERT 1," * Voyager Sound 1987 ! Douglas DeVitt .... President ! Kris Krug ......... V.P. ! Lloyd
         Schoenbach .. Treasurer ",1,"RETURN",i%
1400  ENDIF
1401  '
1402  IF main_bar$(p%)=" icons "
1403    @display_palette
1404  ENDIF
1405  '
1406  IF main_bar$(p%)=" outline "
1407    IF i_box!
1408      i_box!=FALSE
1409      check_main!(outline%)=FALSE   ! set checkmark flag for main menu
1410    ELSE
1411      i_box!=TRUE
1412      check_main!(outline%)=TRUE    ! ditto
1413    ENDIF
1414  ENDIF
1415  '
1416  IF main_bar$(p%)=" sequence "
1417    IF i_num!
1418      i_num!=FALSE
1419      check_main!(sequence%)=FALSE  ! same here
1420    ELSE
1421      i_num!=TRUE
1422      check_main!(sequence%)=TRUE   ! ditto.
1423    ENDIF
1424  ENDIF
1425  '
1426  '
1427  IF main_bar$(p%)=" cursor "
1428    IF i_cur!
1429      i_cur!=FALSE
1430      check_main!(cursor%)=FALSE  ! same here
1431    ELSE
1432      i_cur!=TRUE
1433      check_main!(cursor%)=TRUE   ! ditto
1434    ENDIF
1435  ENDIF
1436  '
1437  IF main_bar$(p%)=" centroid "
1438    IF i_dot!
1439      i_dot!=FALSE
1440      check_main!(centroid%)=FALSE
1441    ELSE
1442      i_dot!=TRUE
1443      check_main!(centroid%)=TRUE
1444    ENDIF
1445  ENDIF
1446  '
1447  IF main_bar$(p%)=" alt_screen "
1448    IF alt_scr!
1449      alt_scr!=FALSE
1450      check_main!(alt_screen%)=FALSE
1451    ELSE
1452      alt_scr!=TRUE
1453      check_main!(alt_screen%)=TRUE
1454    ENDIF
1455  ENDIF
1456  '
1457  IF main_bar$(p%)=" gain matrix "
1458    IF gain_matrix!
1459      gain_matrix!=FALSE
1460      check_main!(gain_matrix%)=FALSE
1461    ELSE
1462      gain_matrix!=TRUE
1463      check_main!(gain_matrix%)=TRUE
1464    ENDIF
1465  ENDIF
1466  '
1467  IF main_bar$(p%)=" directory "
1468    CLS
1469    ALERT 2,"Select Drive",1," A ! B ! D ",i%
1470    IF i%=1
```

```
1471        LET direct$="A:*.*"
1472      ENDIF
1473      IF i%=2
1474        LET direct$="B:*.*"
1475      ENDIF
1476      IF i%=3
1477        LET direct$="D:*.*"
1478      ENDIF
1479      PRINT AT(1,1);"Directory ";direct$
1480      PRINT
1481      FILES direct$
1482      '                        ! wait for mouse
1483      REPEAT
1484      UNTIL MOUSEK
1485    ENDIF
1486    '
1487    IF main_bar$(p%)=" disk space "
1488      CLS
1489      ALERT 2,"Bytes Remaining     ! !Select Drive    ",1," A ! B ",i%
1490      PRINT AT(20,10);CHR$(64+i%);":  Bytes remaining = ";DFREE(i%);
1491      REPEAT
1492      UNTIL MOUSEK
1493    ENDIF
1494    '
1495    IF main_bar$(p%)=" load "
1496      CLS
1497      FILESELECT "\*.V6R","",in_file$
1498      IF in_file$<>""
1499        DEFTEXT 3,1,0,32
1500        TEXT 1,100,"Loading the database."
1501        sound_1
1502        @input_all
1503      ENDIF
1504    ENDIF
1505    '
1506    IF main_bar$(p%)=" save "
1507      CLS
1508      FILESELECT "\*.V6R","MIX01.V6R",out_file$
1509      IF out_file$<>""
1510        @save_all
1511      ENDIF
1512    ENDIF
1513    '
1514    IF main_bar$(p%)=" default drive "
1515      ALERT 2,"Select Default Drive ! for load & save operations",1," A ! B ! D",default_drive%
1516      IF default_drive%=3
1517        default_drive%=4      ! for drive D:
1518      ENDIF
1519      CHDRIVE default_drive%
1520    ENDIF
1521    '
1522    IF main_bar$(p%)=" reset "
1523      message("Memory Clear Function")
1524      @sound_4
1525      CLS
1526      ALERT 3," This function will     ! clear memory!       !           ! Do you want to rethink this?
                 !      ",2," PROCEED ! CANCEL ",button%
1527      IF button%=1
1528        @reset
1529      ENDIF
1530    ENDIF
1531    '
1532    IF main_bar$(p%)=" general "
1533      @help_window
1534    ENDIF
1535    '
1536    @main_menu(FALSE)      ! reset main menu. partial reset
1537    '
1538 RETURN
1539 ' ----------------------------------------------------------------
1540 > PROCEDURE display_palette
1555 ' ----------------------------------------------------------------
1556 PROCEDURE custom1(index%)    !  Custom mouse for application
1557    ' Mouse-Convert data in string
1558    LOCAL backgrnd%,foregrnd%
1559    LET mouse$(index%)=MKI$(7)+MKI$(7)
```

```
1560    LET mouse$(index&)=mouse$(index&)+MKI$(0)
1561    LET mouse$(index&)=mouse$(index&)+MKI$(0)
1562    LET mouse$(index&)=mouse$(index&)+MKI$(1)
1563    RESTORE cust1
1564    FOR i&=1 TO 16
1565      READ backgrnd%
1566      LET mouse$(index&)=mouse$(index&)+MKI$(backgrnd%)
1567    NEXT i&
1568    FOR i&=1 TO 16
1569      READ foregrnd%
1570      LET mouse$(index&)=mouse$(index&)+MKI$(foregrnd%)
1571    NEXT i&
1572    cust1:
1573    DATA 256,256,256,256,4064,3168,2080,63550,2080,3168,4064,256,256,256,256,0
1574    DATA 32770,16388,8200,4112,4064,2080,2080,2080,2080,2080,4064,4112,8200,16388,32770,0
1575  RETURN
1576  '-------------------------------------------------------------------
1577  PROCEDURE med_rez(pal&)    ! set screen to med rez
1578    rez&=1
1579    VOID XBIOS(5,L:-1,L:-1,W:rez&)
1580    IF pal&<>0
1581      @restore_palette(pal&)
1582    ELSE
1583      @m_colors(1)    ! use preset colors
1584    ENDIF
1585    ACLIP 1,0,0,639,199
1586    CLIP 0,0 TO 639,199        ! set clipping for screen
1587    VSYNC
1588  RETURN
1589  '-------------------------------------------------------------------
1590  PROCEDURE low_rez(pal&)    ! set screen to low_rez
1591    rez&=0
1592    VOID XBIOS(5,L:-1,L:-1,W:rez&)
1593    @restore_palette(pal&)
1594    ACLIP 1,0,0,319,199
1595    CLIP 0,0 TO 319,199        ! set clipping for screen
1596    VSYNC
1597  RETURN
1598  '-------------------------------------------------------------------
1599  PROCEDURE m_colors(index&)    ! color presets for medium rez
1600    IF index&=1
1601      SETCOLOR 0,0,0,0
1602      SETCOLOR 1,7,0,0
1603      SETCOLOR 2,0,0,7
1604      SETCOLOR 3,0,5,0
1605    ENDIF
1606    '
1607    IF index&=2
1608      SETCOLOR 0,1,1,1
1609      SETCOLOR 1,7,0,0
1610      SETCOLOR 2,0,0,7
1611      SETCOLOR 3,0,5,0
1612    ENDIF
1613    '
1614  RETURN
1615  '-------------------------------------------------------------------
1616  PROCEDURE packet_out(byte1&,byte2&,byte3&,byte4&)
1617    OUT midi&,255,byte1&,byte2&,byte3&,byte4&    ! sync byte
1618  RETURN
1619  '-------------------------------------------------------------------
1620  '-------------------------------------------------------------------
1621  '-------------------------------------------------------------------
1622  PROCEDURE dis_active_icon
1623    LOCAL icn$
1624    GRAPHMODE 1
1625    DEFTEXT 3,0,0,4
1626    TEXT (62-(4*(active_icon&<10))),14,0,STR$(active_icon&)
1627    TEXT 1,50,-75,SPACE$(14)
1628    TEXT 1,50,-75,icon_name$(active_icon&)
1629    icn$=icons$(active_icon&)
1630    put_clip(31,22,icn$)        ! reset X and Y for icon, pre_clip
1631    PUT 1,17,icn$,3             ! active icon to screen
1632  RETURN
1633  '-------------------------------------------------------------------
1634  PROCEDURE reset            ! reset the mix to no mix at all
```

```
1636    ARRAYFILL yc&(),0
1637    ARRAYFILL x_bias&(),0   ! icon graphic bias    X_DRAW&=XC&()-X_...&()
1638    ARRAYFILL y_bias&(),0
1639    ARRAYFILL mag&(),0      ! magnitude / radius
1640    ARRAYFILL ang&(),0      ! angle of icon
1641    ARRAYFILL active!(),FALSE   ! is channel currently active
1642    ARRAYFILL gain_left&(),&HFFF
1643    ARRAYFILL gain_right&(),&HFFF         ! preset DACS to OFF
1644    ARRAYFILL db_left(),-100
1645    ARRAYFILL db_right(),-100
1646    ARRAYFILL decibels(),-100   ! before theta calculation
1647    ARRAYFILL mix_data_xc&(),0
1648    ARRAYFILL mix_data_yc&(),0  ' event storage
1649    ARRAYFILL mix_data_dac(),-90
1650    icon_count&=0
1651.   active_icon&=1
1652    FOR i&=1 TO icon_max&
1653      icons$(i&)=""
1654      channel_out(i&)             ! reset dacs
1655    NEXT i&
1656    event_number&=0
1657    show_event&=event_number&
1658 RETURN
1659 ' -----------------------------------------------------------------
1660 ) PROCEDURE help_window
1708 ' -----------------------------------------------------------------
1709 ) PROCEDURE screen
1796 ' -----------------------------------------------------------------
1797 ) PROCEDURE show.it
1872 ' -----------------------------------------------------------------
1873 PROCEDURE decibels       ! compute decibels and other interesting stuff
1874    LOCAL bels
1875    LET bels=-ROUND(r&*d_scale,2)       ! round off decibel gain
1876    non_linear(a&,bels)                 ! re-scale for fade out
1877    LET decibels(active_icon&)=bels     ! assign to data array
1878    ATEXT 46,26,0,STR$(a&,3)            ! faster text I/O
1879    '
1880    ' compute left and right gain components for xfer to DAC
1881    '
1882    IF (ABS(a&)>mono_angle&)
1883      db_left(active_icon&)=MAX(bels+db_coef(ADD(a&,90),0),-90)   ! based on table lookup
1884      db_right(active_icon&)=MAX(bels+db_coef(ADD(a&,90),1),-90)
1885    ELSE
1886      db_left(active_icon&)=MAX(bels-3,-90)
1887      db_right(active_icon&)=MAX(bels-3,-90)
1888    ENDIF
1889    ATEXT 34,18,0,STR$(db_left(active_icon&),5,1)
1890    ATEXT 34,34,0,STR$(db_right(active_icon&),5,1)
1891 RETURN
1892 ' -----------------------------------------------------------------
1893 PROCEDURE channel_out(channel_number&)
1894    '
1895    ' dac / channel address      6 bits
1896    '
1897    ' 4 bits out of 6 are used, remaining for address expansion
1898    ' set this way for simplified hardware addressing
1899    '
1900    '         Channel #1      Channel #2      Channel #3      Channel #4
1901    '         L     R         L     R         L     R         L     R
1902    ' DACS    0     4         1     5         2     6         3     7
1903    '
1904    ' compute actual DAC setting from left and right db gain
1905    ' and send the data !
1906    '
1907    ' code includes DAC cross-reference for now
1908    ' going to use 12 bits to set the DAC, for VCA gain
1909    '
1910    LOCAL left_dac_number&,right_dac_number&
1911    '
1912    ' IF channel_number&>icon_max&      ' test for out of range and trap
1913    '   global_error$="Channel number request is greater than hardware configuration."
1914    ' ERROR 99                           ! call global error trap
1915    ' ENDIF
1916    '
1917    left_dac_number&=SUB(channel_number&,1)
1918    right_dac_number&=ADD(channel_number&,3)  ! DAC cross reference for now
```

```
1919  '
1920    IF active!(channel_number&)
1921  '
1922      gain_left&(channel_number&)=SUB(dac_offset&(left_dac_number&),db_left(channel_number&)*20)
1923      gain_right&(channel_number&)=SUB(dac_offset&(right_dac_number&),db_right(channel_number&)*20)
1924      @dac_out(left_dac_number&,gain_left&(channel_number&))
1925      @dac_out(right_dac_number&,gain_right&(channel_number&))
1926  '
1927    ELSE
1928  '
1929      @dac_out(left_dac_number&,dac_mute&)   ! mute the channel if not active
1930      @dac_out(right_dac_number&,dac_mute&)
1931    ENDIF
1932  '
1933 RETURN
1934  ' ---------------------------------------------------------------
1935 DEFFN address_out1(reg%,byte%)=OR(OR(SHL(reg%,12),byte%),write_address%)
1936  ' this function encodes the output address for the voyager port
1937  '
1938 DEFFN address_out(reg%,byte%)=(reg%*&H1000) OR byte% OR &HFB0000
1939  ' at least this one works
1940  ' ---------------------------------------------------------------
1941 PROCEDURE dac_out(dac%,data%)
1942  '
1943  ' routine to address DAC and output 12 bits of data to the DAC
1944  ' using the Voyager Sound dac/Atari interface (VSR-ST-VCA-01)
1945  ' special GFA pointer is used, much faster than PEEK
1946  '
1947   IF port_write!           ! check for I/O inhibit
1948     *BYTE(@address_out(0,BSET(dac%,6)))            ! setup address on port 0, bit 6 set
1949     *BYTE(@address_out(1,BYTE(data%)))             ! setup low byte - byte
1950     *BYTE(@address_out(2,AND(SHR(data%,8),&HF)))   ! setup high byte - nibble
1951     *BYTE(@address_out(0,dac%))                    ! output dac # stobe data_clk
1952     *BYTE(@address_out(0,BSET(dac%,6)))            ! strobe data_clk
1953   ENDIF
1954  ' all done
1955 RETURN
1956  ' ---------------------------------------------------------------
1957 PROCEDURE ports_setup !        (1) write :  (0) read
1958   IF port_write!          ! set all 3 8-bit ports to write
1959     FOR i&=3 TO 5
1960       *BYTE(@address_out(i&,&X11111111))
1961     NEXT i&
1962   ENDIF
1963 RETURN
1964  '
1965  ' ---------------------------------------------------------------
1966 PROCEDURE pop_menu(pop_menu_x&,pop_menu_y&,VAR flag$)
1967  '
1968  '
1969   LOCAL x&,y&,k&,i&
1970   LOCAL popx&,popy&,popk&,popxdif&,popydif&
1971   LOCAL poplx&,poprx&,popty&,popby&
1972   LOCAL numlines&,left&,right&,top&,bottom&,xbias&,highx&,highy&
1973   LOCAL stringlength&,choice&,tempuse$,sizer&,rez&,txt&
1974   DIM poplines$(30)       ! temp storage for menu
1975   popx&=pop_menu_x&
1976   popy&=pop_menu_y&
1977  '
1978  ' all variables local to this and called procedures
1979  '
1980   FOR x&=0 TO 24
1981     READ poplines$(x&)
1982     EXIT IF poplines$(x&)="XXX"       ! end of data array for menu
1983   NEXT x&
1984   numlines&=x&-1
1985  '
1986   IF numlines&<2         ! no point in menu array this small - ERROR ?
1987     ALERT 3,"Error in pop_menu call",1,"Abort",x&
1988     flag$="-2"           ! error flag passed back to calling routine
1989   ENDIF
1990  '
1991  ' vertical spacing
1992   rez&=XBIOS(4)          ! get resolution
1993  '
1994  '
```

```
1995    y&=0
1996    FOR x&=0 TO numlines&
1997      poplines$(x&)=" "+TRIM$(poplines$(x&))+" "  ! clean up the strings
1998      y&=MAX(y&,LEN(poplines$(x&)))  ! get max line length
1999    NEXT x&
2000    ' clean up title line and center
2001    IF LEN(poplines$(0))=>y&        ! is title larger than menu entry
2002      ADD y&,3
2003    ENDIF
2004    stringlength&=y&
2005    '
2006    poplx&=0
2007    popty&=0
2008    '
2009    IF rez&=0                ! if low resolution
2010      sizer&=7                                  ! change for different font sizes
2011      txt&=4
2012      xbias&=21
2013      DEFTEXT 1,0,0,txt&
2014      poprx&=y&*6+10
2015      popby&=numlines&*7+16
2016      highx&=318
2017      highy&=199
2018    ELSE IF rez&=1           ! medium resolution
2019      sizer&=10
2020      txt&=6
2021      xbias&=22
2022      DEFTEXT 1,0,0,txt&
2023      poprx&=y&*9+10                    ! horiz.size of the popmenu box set by max size
2024      popby&=numlines&*10+16            ! vertical size of box
2025      highx&=639
2026      highy&=199
2027    ELSE IF rez&=2           ! mono
2028      sizer&=12
2029      txt&=13
2030      xbias&=32
2031      DEFTEXT 1,0,0,txt&
2032      poprx&=y&*12+10
2033      popby&=numlines&*14+16
2034      highx&=639
2035      highy&=399
2036    ENDIF
2037    '
2038    ' wait loop for menu position info
2039    '
2040    SHOWM
2041    DEFMOUSE 0
2042    popk&=MOUSEK
2043    '
2044    1.pop.label:
2045    SETMOUSE popx&+9,popy&+7 ! now set the mouse
2046    '
2047    popxdif&=poprx&-poplx&
2048    popydif&=popby&-popty&
2049    poplx&=popx&
2050    poprx&=popx&+popxdif&
2051    popty&=popy&
2052    popby&=popy&+popydif&
2053    '
2054    left&=poplx&+1           ! setup margins
2055    right&=poprx&-1
2056    top&=popty&+11
2057    bottom&=top&+(numlines&*sizer&)
2058    '
2059    IF right&>highx& AND bottom&>highy&  ! test mouse, margin limits
2060      popx&=highx&-popxdif&
2061      popy&=highy&-popydif&
2062      GOTO 1.pop.label
2063    ENDIF
2064    IF right&>highx&
2065      popx&=highx&-popxdif&
2066      GOTO 1.pop.label
2067    ENDIF
2068    IF bottom&>highy&
2069      popy&=highy&-popydif&
2070      GOTO 1.pop.label
```

```
2071    ENDIF
2072    '
2073    SGET tempuse$
2074    DEFFILL 0,2,8
2075    GRAPHMODE 1
2076    @pop_box
2077    SHOWM
2078    REPEAT
2079      choice&=-2  !  this means initialze pop menu
2080      MOUSE x&,y&,k&
2081      '
2082      ' First the Close Menu Box
2083      IF x&>poplx& AND y&>popty& AND y&<popty&+12 AND x&<poplx&+20 AND k&=1
2084        DEFFILL 1,2,8
2085        PRBOX poplx&,popty&,poplx&+20,popty&+12
2086        GRAPHMODE 3
2087        DEFTEXT 1,0,0,6
2088        TEXT poplx&+6,popty&+9,CHR$(5)
2089        PAUSE 10
2090        DEFFILL 0,2,8
2091        GRAPHMODE 1
2092        PRBOX poplx&,popty&,poplx&+20,popty&+12
2093        RBOX poplx&,popty&,poplx&+20,popty&+12
2094        TEXT poplx&+6,popty&+9,CHR$(5)
2095        DEFTEXT 1,0,0,txt&           ! restore to proper rez text
2096        PAUSE 5
2097        choice&=-1
2098      ENDIF
2099      '
2100      ' Now the Title Bar
2101      IF x&>poplx&+20 AND x&<right& AND y&>popty& AND y&<popty&+10 AND k&=1
2102        DEFFILL 1,2,1
2103        PRBOX poplx&,popty&,poprx&,popty&+12
2104        DEFFILL 0,2,0
2105        PRBOX poplx&,popty&,poplx&+20,popty&+12
2106        RBOX poplx&,popty&,poplx&+20,popty&+12
2107        TEXT poplx&+6,popty&+9,CHR$(5)
2108        GRAPHMODE 4
2109        TEXT poplx&+:bias&,popty&+8,poplines(0)
2110        GRAPHMODE 1
2111        choice&=0
2112        PAUSE 5
2113      ENDIF
2114      '
2115      ' Now for the Menu Options
2116      IF x&>left& AND x&<right& AND y&>top& AND y&<bottom& AND k&<>1
2117
2118        FOR i&=1 TO numlines&
2119          pop_options(i&,x&,y&,k&,choice&)       ! TEST FOR ALL options
2120        NEXT i&
2121        '
2122      ENDIF
2123    '
2124    UNTIL k&=1 AND choice&>-2 AND x&<right& AND x&>left& AND y&>top&-12 AND y&<bottom&
2125    '
2126    ' clean up screen and free memory
2127    '
2128    SPUT tempuse$      ! put the old screen back
2129    tempuse$=""        ! null the screen buffer
2130    '
2131    ~GRAF_SHRINKBOX(poplx&,popty&,20,5,poplx&,popty&,poprx&-poplx&,popby&-popty&)
2132    '
2133    IF choice&>-1
2134      flag$=poplines$(choice&)
2135    ELSE
2136      flag$="-2"       ! some kind of error
2137    ENDIF
2138    ERASE poplines$()
2139 RETURN
2140 END
2141 '
2142 ' ----------------------------------------------------------------
2143 '
2144 PROCEDURE pop_box
2145    LOCAL x&
2146    ~GRAF_GROWBOX(poplx&,popty&,10,10,poplx&,popty&,poprx&-poplx&,popby&-popty&)
```

```
2147    PRBOX poplx&,popty&,poprx&,popby&
2148    RBOX poplx&,popty&,poprx&,popby&
2149    DEFFILL 1,2,1
2150    PRBOX poplx&,popty&,poprx&,popty&+12
2151    DEFFILL 0,2,0
2152    PRBOX poplx&,popty&,poplx&+20,popty&+12
2153    RBOX poplx&,popty&,poplx&+20,popty&+12
2154    DEFTEXT 1,0,0,6
2155    TEXT poplx&+6,popty&+9,CHR$(5)
2156    DEFTEXT 1,0,0,txt&
2157    '
2158    TEXT poplx&+xbias&,popty&+8,popline$(0)   ! modified for resolutions
2159    '
2160    FOR x&=1 TO numlines&
2161      TEXT left&,ADD(top&,MUL(x&,sizer&)),popline$(x&)
2162    NEXT x&
2163 RETURN
2164 '
2165 ' -------------------------------------------------------------------
2166 '
2167 PROCEDURE pop_options(number&,VAR x&,y&,k&,choice&)
2168    LOCAL opt1&,opt2&
2169    MOUSE x&,y&,k&
2170    opt1&=MUL(SUB(number&,1),sizer&)
2171    opt2&=MUL(number&,sizer&)
2172    IF y&>top&+opt1& AND y&<top&+opt2&
2173      GRAPHMODE 1
2174      TEXT left&,top&+opt2&,SPACE$(stringlength&)
2175      GRAPHMODE 4
2176      TEXT left&,top&+opt2&,popline$(number&)
2177      SHOW
2178      REPEAT
2179        MOUSE x&,y&,k&
2180      UNTIL k&=1 OR y&<top&+opt1& OR y&>top&+opt2& OR x&<left& OR x&>right&
2181      GRAPHMODE 1
2182      TEXT left&,top&+opt2&,popline$(number&)
2183      choice&=number&
2184    ENDIF
2185 RETURN
2186 ' -------------------------------------------------------------------
2187 PROCEDURE compute_polar(x&,y&,VAR decibels,angle&)
2188    ' get current polar values for cursor / non-linear not here
2189    LOCAL xr,yr,radius
2190    yr=SUB(ygraph_offset&,y&)*scale
2191    xr=SUB(x&,xgraph_offset&)
2192    radius=SQR(xr*xr+yr*yr)
2193    decibels=-ROUND(radius*d_scale,2)
2194    IF yr==0
2195      angle&=90*SGN(xr)
2196    ELSE
2197      angle&=DEG(ATN(xr/yr))
2198    ENDIF
2199 RETURN
2200 ' -------------------------------------------------------------------
2201 PROCEDURE screen_buffer_preset(buffer&,screen$)
2202    LOCAL buffer_address%
2203    SELECT buffer&
2204    CASE 1
2205      buffer_address%=s_buffer_a%
2206    CASE 2
2207      buffer_address%=s_buffer_b%
2208    ENDSELECT
2209    ~XBIOS(5,L:buffer_address%,L:-1,W:-1)  ! set logical screen
2210    SPUT screen$
2211    ~XBIOS(5,L:screen_base%,L:-1,W:-1)     ! set back to main screen
2212 RETURN
2213 ' -------------------------------------------------------------------
2214 PROCEDURE screen_write(mode&)
2215    LOCAL x&,y&,k&,i&
2216    ~XBIOS(5,L:s_buffer_a%,L:-1,W:-1)  ! set buffer as logical
2217    SPUT mix_screen$  ! background into buffer
2218    FOR i&=1 TO icon_count&  ! re_write all icons to screen
2219      IF active!(i&)
2220        PUT SUB(xc&(i&),x_bias&(i&)),SUB(yc&(i&),y_bias&(i&)),icons$(i&),6
2221      ENDIF
2222    NEXT i&
```

```
2223    SELECT mode&              ! write cursor location
2224    CASE 1
2225      MOUSE x&,y&,k&
2226      IF x&+15<x_limit& AND y&>y_limit&
2227        @compute_polar(x&,y&,display_decibels,display_angle&) ! output current cursor
2228        ATEXT x&-15,y&+9,0,STR$(display_decibels,5)
2229        ATEXT x&+7,y&-1,0,STR$(display_angle&,3)
2230      ENDIF
2231    ENDSELECT
2232    ~XBIOS(5,L:screen_base%,L:-1,W:-1)  ! main as logical screen
2233    BMOVE re_buffer%,re_screen%,re_bytes% ! copy off buffer to main screen
2234 RETURN
2235 ' ------------------------------------------------------------------
2236 PROCEDURE gain(icon&,inc&)   ! pan constant magnitude
2237    LOCAL gain&
2238    IF active!(icon&)
2239      gain&=MIN(MAX(ADD(mag&(icon&),inc&),0),mag_limit&) ! set limits
2240      xc&(icon&)=gain&*SINQ(ang&(icon&))+xgraph_offset&     ! graphic coordinates
2241      yc&(icon&)=ygraph_offset&-((gain&*COSQ(ang&(icon&)))/scale)
2242      mag&(icon&)=gain&
2243      @db_out(icon&)
2244      @active_update
2245    ENDIF
2246 RETURN
2247 ' ------------------------------------------------------------------
2248 PROCEDURE pan(icon&,inc&)   ! pan constant magnitude
2249    LOCAL angle&
2250    IF active!(icon&)
2251      angle&=MIN(MAX(ADD(ang&(icon&),inc&),-90),90)
2252      xc&(icon&)=mag&(icon&)*SINQ(angle&)+xgraph_offset&       ! graphic coordinates
2253      yc&(icon&)=ygraph_offset&-((mag&(icon&)*COSQ(angle&))/scale)
2254      ang&(icon&)=angle&
2255      @db_out(icon&)
2256      @active_update
2257    ENDIF
2258 RETURN
2259 ' ------------------------------------------------------------------
2260 PROCEDURE active_update
2261    screen_write(0)
2262    ox&=xc&(active_icon&)
2263    oy&=yc&(active_icon&)
2264    x&=ox&
2265    y&=oy&
2266    last_r&=mag&(active_icon&)
2267    last_a&=ang&(active_icon&)
2268    @polar(TRUE)
2269    @decibels
2270 RETURN
2271 ' ------------------------------------------------------------------
2272 PROCEDURE db_out(icon&)
2273    LOCAL bels,a&
2274    a&=ang&(icon&)
2275    LET bels=-ROUND(mag&(icon&)*d_scale,2)            ! round off decibel gain
2276    non_linear(a&,bels)
2277    LET decibels(icon&)=bels                          ! assign to data array
2278
2279    ' compute left and right gain components for xfer to DAC
2280
2281    IF active!(icon&)
2282      IF (ABS(a&)>mono_angle&)
2283        db_left(active_icon&)=MAX(bels+db_coef(ADD(a&,90),0),-90)   ! based on table lookup
2284        db_right(active_icon&)=MAX(bels+db_coef(ADD(a&,90),1),-90)
2285      ELSE
2286        db_left(active_icon&)=MAX(bels-3,-90)
2287        db_right(active_icon&)=MAX(bels-3,-90)
2288      ENDIF
2289      @channel_out(icon&)        ! output to DAC
2290    ENDIF
2291 RETURN
2292 ' ------------------------------------------------------------------
2293 PROCEDURE old_position              ! used by direct procedure
2294    SETMOUSE x_old_icon&,y_old_icon&
2295    xc&(active_icon&)=x_old_icon&
2296    yc&(active_icon&)=y_old_icon&
2297    x&=x_old_icon&
```

```
2298      y&=y_old_icon&
2299      k&=1                    ! simulate mouse button down to force update
2300    RETURN
2301  ' --------------------------------------------------------------------
2302  PROCEDURE set_db_a(icon&,decibels,angle&)
2303    IF active!(icon&)
2304      mag&(icon&)=-(decibels/d_scale)
2305      ang&(icon&)=angle&
2306  '   xc&(icon&)=mag&(icon&)*SINQ(angle&)+xgraph_offset&
2307  '   yc&(icon&)=ygraph_offset&-((mag&(icon&)*COSQ(angle&))/scale)
2308      @db_out(icon&)
2309      @screen_write(0)
2310    ENDIF
2311  RETURN
2312  ' --------------------------------------------------------------------
2313  PROCEDURE set_x_y(icon&,x&,y&)
2314    LOCAL db,ang&
2315    IF active!(icon&)
2316      @compute_polar(x&,y&,db,ang&)
2317      @set_db_a(icon&,db,ang&)
2318    ENDIF
2319  RETURN
2320  ' --------------------------------------------------------------------
2321  PROCEDURE save_all
2322    OPEN "O",#1,out_file$
2323    WRITE #1,icon_max&,icon_count&
2324    FOR i&=1 TO icon_count&
2325      WRITE #1,xc&(i&),yc&(i&),x_bias&(i&),y_bias&(i&),mag&(i&),ang&(i&),active!(i&)
2326    NEXT i&
2327    FOR i&=1 TO icon_count&
2328      PRINT #1,MKI$(LEN(icons$(i&)));icons$(i&);    ! output the graphic icon
2329    NEXT i&
2330    CLOSE #1
2331  RETURN
2332  ' --------------------------------------------------------------------
2333  PROCEDURE input_all
2334    LOCAL i_max&,k&,i_count&
2335    OPEN "I",#1,in_file$
2336    INPUT #1,i_max&,i_count&
2337    IF i_max&>icon_max&
2338      ALERT 1,"Error: Icon count exceeded !    | An error for now.",1,"Return",k&
2339      GOTO input_all_abort
2340    ELSE
2341      icon_max&=i_max&
2342      icon_count&=i_count&
2343    ENDIF
2344    FOR i&=1 TO icon_count&
2345      INPUT #1,xc&(i&),yc&(i&),x_bias&(i&),y_bias&(i&),mag&(i&),ang&...,active!(i&)
2346    NEXT i&
2347    FOR i&=1 TO icon_count&
2348      icons$(i&)=INPUT$(CVI(INPUT$(2,#1)),#1)
2349    NEXT i&
2350    input_all_abort:
2351    CLOSE #1
2352  RETURN
2353  ' --------------------------------------------------------------------
2354  PROCEDURE sort_file(filename$)
2355    LOCAL count%
2356    DIM array$(500)
2357    OPEN "I",#1,filename$
2358    RECALL #1,array$(),500,count%
2359    CLOSE #1
2360    SSORT array$(),count%
2361    OPEN "O",#1,filename$
2362    STORE #1,array$(),count%
2363    CLOSE #1
2364    ERASE array$()
2365  RETURN
2366  ' --------------------------------------------------------------------
2367  PROCEDURE message(msg$)
2368    PRINT AT(1,24);SPACE$(60);
2369    PRINT AT(1,24);msg$;
2370  RETURN
2371  ' --------------------------------------------------------------------
2372  PROCEDURE key_click(mode&)
2373    SELECT mode&
```

```
2374    CASE 1
2375      SPOKE &H484,PEEK(&H484) OR 1
2376    CASE 0
2377      SPOKE &H484,PEEK(&H484) AND NOT 1
2378    ENDSELECT
2379 RETURN
2380 ' ------------------------------------------------------------
2381 PROCEDURE vca_gain_set(dac&,db)
2382   '
2383   ' set output DAC to exact DB value with limit checks
2384   '
2385   LOCAL setting&
2386   setting&=SUB(dac_offset&(dac&),20*MAX(MIN(db,db_high),db_low))
2387   @dac_out(dac&,setting&)
2388 RETURN
2389 ' ------------------------------------------------------------
2390 PROCEDURE pre_weight(x&,y&)
2391   FOR i&=0 TO 5           ! preset moving average
2392     mosx%(i&)=x&
2393     mosy%(i&)=y&
2394   NEXT i&
2395 RETURN
2396 ' ------------------------------------------------------------
2397 PROCEDURE non_linear(angle&,VAR bels)  ! routine for non-linear scaling of db
2398   LOCAL temp1
2399   temp1=(ABS(angle&)>60)*1.5       ! if angle > 60 degrees
2400   IF bels<non_limit+temp1          ! non_limit is < 0
2401     bels=ABS(bels)                 ! limit of -90 db
2402     bels=-MIN(bels^(1+((bels+non_limit+temp1)*(non_linear+ABS(45-ABS(angle&))*0.0025))),90)
2403   ENDIF
2404 RETURN
2405 ' ------------------------------------------------------------
2406 PROCEDURE put_clip(w&,h&,VAR icn$)
2407   LOCAL logical_screen%                   ! routine to reset height and width
2408   DIM buffer00!(32000)
2409   logical_screen%=XBIOS(3)                ! save for reset
2410   ~XBIOS(5,L:V:buffer00!(0),L:-1,W:-1)    ! buffer as temp screen
2411   PUT 0,0,icn$,3                          ! onto temp screen
2412   GET 0,0,w&,h&,icn$                      ! re-map into icn$ with limits
2413   ~XBIOS(5,L:logical_screen%,L:-1,W:-1)   ! reset to old logical screen
2414   ERASE buffer00!()
2415 RETURN
2416 ' ------------------------------------------------------------
2417 PROCEDURE vgr_logo(xcntr,ybotm,xk,yk)
2418   LOCAL x,x1,x2,i,y,w1,w2,r,rx,ry
2419   ' Voyager Logo  lhs  16aug89
2420   ' For Low  res
2421   ' xk =  x scaling
2422   ' yk =  y scaling
2423   '   xcntr=(320*xk)/2        ! center
2424   '   ybotm=(200*yk)-(14*yk)  ! bottom
2425   ' Horizontal lines (8)
2426   DEFLINE 1,1,2,2
2427   RESTORE vgr_log_1
2428   vgr_log_1:
2429   DATA 144,0,39,72,98,116,130,137,144
2430   READ x
2431   x=x*xk
2432   x1=xcntr-x
2433   x2=xcntr+x
2434   FOR i=1 TO 8
2435     READ y
2436     y=ybotm-yk*y
2437     LINE x1,y,x2,y
2438   NEXT i
2439   ' Vertical line    (1)
2440   DATA 84
2441   READ y
2442   y=ybotm-yk*y
2443   LINE xcntr,ybotm,xcntr,y
2444   ' Circles          (4)
2445   DATA 0,1800,0,0,33,72,111,144
2446   READ w1,w2,x,y
2447   x=x*xk+xcntr
2448   y=ybotm-yk*y
2449   FOR i=1 TO 4
```

```
2450      READ r
2451      rx=xk*r
2452      ry=yk*r
2453      ELLIPSE x,y,rx,ry,w1,w2
2454    NEXT i
2455    ' Ellipses           (3)
2456    DATA 1800,3600,0,144,26,66,92
2457    READ w1,w2,x,y
2458    ry=yk*r
2459    x=x*xk+xcntr
2460    y=ybotm-yk*y
2461    FOR i=1 TO 3
2462      READ r
2463      rx=xk*r
2464      ELLIPSE x,y,rx,ry,w1,w2
2465    NEXT i
2466    '   DEFTEXT 3,2,0,32
2467    '   TEXT xcntr-(45*xk),ybotm-(60*yk),"Voyager"
2468    '   End of Logo
2469  RETURN
2470  ' --------------------------------------------------------------
2471  PROCEDURE dolby          ! routine for Dolby Screen
2472    LOCAL o_x&,o_y&,x_p&,y_p&,ra&,an&,ax&,ay&,ak&
2473    LOCAL x&,y&,oldx&,oldy&
2474    CLS
2475    DEFMOUSE 7
2476    COLOR 1
2477    GRAPHMODE 1
2478    DEFLINE 3,1,1,1
2479    LINE 639/2,180,639/2,0
2480    LINE 0,180/2,639,180/2
2481    DEFTEXT 1,2,0,13
2482    TEXT 10,25,"LEFT FRONT"
2483    TEXT 550,25,"RIGHT FRONT"
2484    TEXT 10,165,"LEFT BACK"
2485    TEXT 550,165,"RIGHT BACK"
2486    DEFTEXT 3,0,0,6
2487    TEXT 0,199-7,"? DOLBY SURROUND"
2488    o_x&=639/2
2489    o_y&=180/2
2490    DEFFN x(x_p&)=x_p&-o_x&
2491    DEFFN y(y_p&)=o_y&-y_p&
2492    PRINT tex_color3$;
2493    REPEAT
2494      SHOWM
2495      MOUSE ax&,ay&,ak&
2496      dolby_cord
2497    UNTIL MOUSEK
2498    spline
2499  RETURN
2500  ' --------------------------------------------------------------
2501  '
2502  ' SPLINE.LST
2503  '
2504  PROCEDURE spline
2505    LOCAL sx,sy,h,t,s0,sn,r,dr,s,temp,connect!,num_max&,step_max&
2506    LOCAL num&,ax&,ay&,ak&,back&,steps&,num_spl&,cnt&,key&,n&,m&,j&,k&,n1&
2507    LOCAL i_pred&,dolby_key$,dolby$,off&
2508    REPEAT
2509      init_spline
2510      do_spline
2511      '
2512      dolby$=STRING$(400,0)                ! setup temp string  er
2513      BMOVE dolby_icon%,V:dolby$,400       ! setup med-r.. ..    inli e
2514      '
2515      PRINT AT(1,1);SPACE$(80);
2516      PRINT inverseon$;
2517      PRINT AT(1,1);"* Press ESC to plot new spline  or  * click mouse to abort"
2518      PRINT inverseoff$;
2519      off&=16
2520      REPEAT
2521        FOR i&=1 TO num_spl&
2522          ax&=x_spline(i&)
2523          ay&=y_spline(i&)
2524          PUT ax&-off&,ay&-off&,dolby$,6
2525          dolby_cord
2526          dolby_key$=INKEY$
```

```
2527            EXIT IF dolby_key$=CHR$(27) OR MOUSEK
2528            VSYNC
2529            VSYNC
2530            VSYNC
2531            VSYNC
2532            VSYNC
2533            VSYNC
2534            PUT ax&-off&,ay&-off&,dolby$,6
2535         NEXT i&
2536      UNTIL MOUSEK OR dolby_key$=CHR$(27)
2537      cleanup_spline
2538   UNTIL MOUSEK
2539 RETURN
2540 '
2541 PROCEDURE init_spline
2542    num_max&=25
2543    step_max&=20
2544    DIM a(num_max&),b(num_max&),c(num_max&),d(num_max&)
2545    DIM x_support(num_max&),y_support(num_max&)
2546    DIM x_spline(num_max&*step_max&),y_spline(num_max&*step_max&)
2547 RETURN
2548 '
2549 ' ----------------------------------------------------------------
2550 '
2551 PROCEDURE cleanup_spline
2552    ERASE a(),b(),c(),d(),x_support(),y_support(),x_spline(),y_spline()
2553    PRINT inverseoff$;
2554    dolby$=""        ! clear icon
2555 RETURN
2556 '
2557 ' ----------------------------------------------------------------
2558 '
2559 PROCEDURE do_spline
2560    PRINT CHR$(27);"p";     ! Turn on inverse text
2561    REPEAT
2562      PRINT AT(1,1);SPACE$(80);
2563      PRINT AT(1,1);" Left Mouse : Set Support Positions"+SPACE$(5);
2564      PRINT "Right Mouse Button: Start Interpolation";
2565
2566      num&=-1
2567      REPEAT
2568        MOUSE ax&,ay&,ak&
2569
2570        dolby_cord
2571
2572        IF ak&=1 AND ay&>16
2573          PCIRCLE ax&,ay&,2
2574          INC num&
2575          x_support(num&)=ax&
2576          y_support(num&)=ay&
2577          ATEXT ax&,ay&+6,1,STR$(num&)
2578          REPEAT
2579          UNTIL MOUSEK=0
2580        ENDIF
2581
2582        SHOWM
2583      UNTIL num&=num_max& OR ak&=2
2584
2585      IF num&<2
2586        ALERT 1,"Not enough Points!Selected",1,"Continue",back&
2587      ELSE
2588        ALERT 2,"Connect first Point|with last point ?",1,"Yes|No",back&
2589
2590        IF back&=1                       ! When closed curve
2591          connect!=TRUE                  ! set Flag
2592          INC num&                       ! Raise the number of supporting points
2593          x_support(num&)=x_support(0)   ! and move to coordinates of the
2594          y_support(num&)=y_support(0)   ! last point
2595        ELSE
2596          connect!=FALSE
2597        ENDIF
2598
2599        steps&=step_max&   ! at least 1, highest value = step_max&
2600
2601        plane_splines(num&,steps&,connect!,x_support(),y_support(),x_spline(),y_spline())
2602
```

```
2603            ' Finished, now display it
2604
2605          ACLIP 1,0,0,639,399
2606          num_spl&=num&*steps&
2607
2608          FOR cnt&=1 TO num_spl&
2609            ALINE x_spline(PRED(cnt&)),y_spline(PRED(cnt&)),x_spline(cnt&),y_spline(cnt&),1,&HFFFF,0
2610          NEXT cnt&
2611
2612          ACLIP 0,0,0,639,399
2613
2614          PRINT AT(1,1);SPACE$(80);
2615          PRINT AT(1,1);" Press any key for new spline,   Icon demo with space key";""
2616
2617          REPEAT
2618          UNTIL INKEY$=""     ' Clear keyboard buffer
2619          key&=INP(2)
2620        ENDIF
2621
2622   UNTIL key&=32        ! End when <Esc> is pressed
2623   PRINT CHR$(27);"q"   ! Turn off inverse text
2624 RETURN
2625 PROCEDURE plane_splines(n&,m&,connect!,VAR x_support(),y_support(),x_spline(),y_spline())
2626   LOCAL cnt&,j&,k&
2627
2628   IF connect!                              !\
2629     sx=(x_support(1)-x_support(n&-1))*0.5  ! \
2630     sy=(y_support(1)-y_support(n&-1))*0.5  !  \ Set equal at the
2631   ELSE                                     !   ) support points 0 and n&
2632     sx=0                                   !  /
2633     sy=0                                   ! /
2634   ENDIF                                    !/
2635
2636   cub_splines(n&,sx,sx,x_support(),b(),c(),d())
2637
2638   h=1/m&
2639   k&=0
2640   FOR cnt&=1 TO n&
2641     t=-1
2642     FOR j&=0 TO m&-1
2643       x_spline(k&)=((d(cnt&)*t+c(cnt&))*t+b(cnt&))*t+x_support(cnt&)
2644       ADD t,h
2645       INC k&
2646     NEXT j&
2647   NEXT cnt&
2648   x_spline(k&)=x_support(n&)
2649
2650   cub_splines(n&,sy,sy,y_support(),b(),c(),d())
2651
2652   k&=0
2653   FOR cnt&=1 TO n&
2654     t=-1
2655     FOR j&=0 TO m&-1
2656       y_spline(k&)=((d(cnt&)*t+c(cnt&))*t+b(cnt&))*t+y_support(cnt&)
2657       ADD t,h
2658       INC k&
2659     NEXT j&
2660   NEXT cnt&
2661   y_spline(k&)=y_support(n&)
2662
2663 RETURN
2664 PROCEDURE cub_splines(n&,s0,sn,VAR a(),b(),c(),d())
2665   LOCAL n1&,cnt&,r,dr,s
2666   n1&=n&-1
2667
2668   b(0)=(a(1)-a(0)-s0)*6
2669   FOR cnt&=1 TO n1&
2670     b(cnt&)=(a(SUCC(cnt&))-a(cnt&)*2+a(PRED(cnt&)))*3
2671   NEXT cnt&
2672   b(n&)=(a(n1&)-a(n&)+sn)*6
2673
2674   c(0)=b(0)*0.5
2675   b(1)=b(1)-b(0)*0.25
2676   r=1.75
2677   dr=1/r
```

```
2678    c(1)=b(1)/1.75
2679    FOR cnt%=2 TO n1%
2680      s=-0.5*dr
2681      ADD b(cnt%),b(PRED(cnt%))*s
2682      r=s*0.5+2
2683      dr=1/r
2684      c(cnt%)=b(cnt%)*dr
2685    NEXT cnt%
2686    '
2687    s=-dr
2688    b(n%)=b(n%)+b(n1%)*s
2689    r=s*0.5+2
2690    c(n%)=b(n%)/r
2691    FOR cnt%=n1% TO 1 STEP -1
2692      IF b(cnt%)=0
2693        temp=1.0E-89
2694      ELSE
2695        temp=b(cnt%)
2696      ENDIF
2697      MUL c(cnt%),1-c(SUCC(cnt%))/temp*0.5
2698    NEXT cnt%
2699    '
2700    IF b(0)=0
2701      temp=1.0E-89
2702    ELSE
2703      temp=b(0)
2704    ENDIF
2705    '
2706    c(0)=c(0)*(1-c(1)/temp)
2707    FOR cnt%=1 TO n%
2708      i_pred%=PRED(cnt%)
2709      b(cnt%)=a(cnt%)-a(i_pred%)+(c(cnt%)*2+c(i_pred%))/6
2710      d(cnt%)=(c(cnt%)-c(i_pred%))/6
2711    NEXT cnt%
2712    '
2713    FOR cnt%=1 TO n%
2714      MUL c(cnt%),0.5
2715    NEXT cnt%
2716  RETURN
2717  '----------------------------------------
2718  PROCEDURE dolby_cord
2719    x%=@x(mx%)
2720    y%=@y(my%)
2721    ra%=SQR(x%*x%+y%*y%)
2722    '
2723    IF y%=0
2724      an%=90*SGN(x%)
2725    ELSE
2726      an%=DEG(ATN(x%/y%))
2727    ENDIF
2728    '
2729    IF y%<0 AND x%<0    ! 3rd quadrant
2730      an%=-180+an%
2731    ENDIF
2732    IF y%<0 AND x%>0    ! 4th quadrant
2733      an%=180+an%
2734    ENDIF
2735    '
2736    IF x%<>oldx% OR y%<>oldy%
2737      oldx%=x%
2738      oldy%=y%
2739      PRINT AT(67,23);USING "X=#### Y=####",x%,y%;
2740      PRINT AT(67,24);USING "R= ###  i=####",ra%,an%;
2741    ENDIF
2742  RETURN
2743  '----------------------------------------
2744  PROCEDURE solo           ! routine to solo active icon
2745    ARRAYFILL solo!(),FALSE ! preset array to false
2746    solo!(active_icon%)=TRUE ! the solo channel
2747    SWAP solo!(),active!()
2748    solo_logic!=TRUE
2749    update
2750    '
```

```
2751    REPEAT
2752    UNTIL MOUSEK OR INKEY$()""
2753    '
2754    SWAP solo!(),active!()
2755    solo_logic!=FALSE
2756    update
2757 RETURN
2758 ' ---------------------------------------------------------
2759 PROCEDURE solo_on
2760    FOR i%=0 TO icon_count%
2761      solo!(i%)=active!(i%)
2762    NEXT i%
2763    ARRAYFILL active!(),FALSE
2764    active!(active_icon%)=TRUE
2765    solo_logic!=TRUE
2766    update
2767 RETURN
2768 '
2769 PROCEDURE solo_off
2770    FOR i%=0 TO icon_count%
2771      active!(i%)=solo!(i%)
2772    NEXT i%
2773    solo_logic!=FALSE
2774    mix_solo!=FALSE
2775    update
2776 RETURN
2777 ' ---------------------------------------------------------
2778 ' ---------------------------------------------------------
2779 ' ---------------------------------------------------------
2780 ' ---------------------------------------------------------
```

What is claimed is:

1. An apparatus for controlling multiple parameters effecting an audio mix output, said apparatus comprising a controller including a visual display for displaying a visual representation of an input sound signal in a multidimensional space and generating a multiple parameter control signal controlling multiple parameters effecting said audio mix output, each dimension of said multidimensional space separately controlling a mixing parameter or mixing parameters, said control signal being based upon the state of said representation in said multidimensional space, at least two said dimensions being the location of said representation on said visual display, a change in location of said representation on said display causing a change in two or more said mixing parameters, an input device connected to said controller to control the state of said representation in said multidimensional space so as to affect said audio mix output, and a sound signal processing circuit having a sound signal input for receiving a sound input signal, a sound signal output for providing a sound output signal, and a control signal input for receiving said multiple parameter control signal, said circuit modifying said sound input signal based upon said multiple parameter control signal to provide said sound output signal, wherein said multidimensional space represents a multiple channel output mix environment, said multiple parameters include gains associated with each said output, and said sound signal processing circuit provides a plurality of output signals, wherein said visual representation is displayed with respect to a listener origin, and the location of said representation is characterized on said display in polar coordinates including a radius component and an angular displacement component.

2. The apparatus of claim 1 wherein said controller is an interactive controller, and said input device is an interactive input device.

3. The apparatus of claim 1 wherein said display displays a plurality of visual representations of respective input signals, and said sound signal processing circuit has a plurality of sound signal inputs.

4. The apparatus of claim 3 wherein said multidimensional space represents a multiple channel output mix environment with N output channels, said multiple parameters include a gain associated with each unique combination of an input sound signal and an output sound signal, and said sound signal processing circuit provides N output signals and includes M times N controllable amplifiers, where M is the number of input signals, the outputs of said amplifiers that are associated with the same output channel being added to each other to provide said N output signals, each said controllable amplifier being connected to receive a said input sound signal and a unique gain control signal, said multiple parameter control signal including said gain control signals.

5. The apparatus of claim 4 wherein
each said controllable amplifier includes a digital-to-analog converter and a voltage controlled amplifier,
said gain signal includes a multibit digital word that is provided to said digital-to-analog converter,
said digital-to-analog converter provides a control voltage to said voltage controlled amplifier, and
said voltage controlled amplifier controls said amplitude of said output signal based upon said control voltage.

6. The apparatus of claim 5 wherein said digital-to-analog converters provide slew limiting of said control voltage to eliminate control voltage artifacts in the sound output signal.

7. The apparatus of claim 4 wherein said controller provides address and control information to said sound signal processing circuit, and
said address and control information controls gain updating of particular controllable amplifiers.

8. The apparatus of claim 1 wherein said multiple parameters include one or more reverb parameters, and said sound signal processing circuit includes a reverb unit that is controlled by said multiple parameter control signal.

9. The apparatus of claim 1 wherein said multiple parameters include one or more equalization parameters, and said sound signal processing circuit includes an equalizer that is controlled by said multiple parameter control signal.

10. The apparatus of claim 1 wherein said multiple parameters include one or more filtering parameters, and said sound signal processing circuit includes a filter that is controlled by said multiple parameter control signal.

11. The apparatus of claim 1 wherein said multiple parameters include one or more compression parameters, and said sound signal processing circuit includes a dynamics processor that is controlled by said multiple parameter control signal.

12. The apparatus of claim 1 wherein said multidimensional space represents a scene of an audiovisual work, and locations in said space associated with locations in said scene have associated audio parameter sets.

13. The apparatus of claim 12 wherein said audio parameter sets include values for compression, equalization, reverb or delay associated with locations and physical objects in said scene, and said sound processing circuit includes compression, equalization, reverb or delay circuitry.

14. The apparatus of claim 13 wherein said multiple parameters include multidimensional gain values associated with a location of a source of a sound input signal in said scene.

15. The apparatus of claim 1 further comprising a MIDI control line that is connected between said controller and said sound signal processing circuit and transmits said multiple parameter control signal.

16. The apparatus of claim 1 wherein said visual representation is displayed on a display which simulates three dimensions with respect to a listener origin, and the location of said representation is characterized on said display in polar coordinates including a radius component and two angular displacement components.

17. The apparatus of claim 1 wherein said radius component corresponds to a gain for a mix of said input signal, and said angular displacement component corresponds to relative amounts of said input signal in said output signals.

18. The apparatus of claim 17 wherein units of gain associated with said radius component are rescalable.

19. The apparatus of claim 3 wherein said visual representations are icons that are images of sources of the input sound signals.

20. The apparatus of claim 19 wherein said sources are musical instruments, and said icons are images of said musical instruments.

21. The apparatus of claim 1 wherein said multidimensional space represents a stereo mix environment, said multiple parameters include left and right gain, and said sound signal processing circuit provides a left sound output signal and a right sound output signal,
wherein said multiple parameters include left front, center front, right front, and rear gain, and said sound signal processing circuit provides left front, center front, right front, and rear output signals.

22. The apparatus of claim 1 wherein said sound signal processing circuit includes
a controllable amplifier for each said output signal,
each said controllable amplifier being connected to receive said input sound signal and a gain control signal to provide a respective amplified sound input signal as said sound output signal, said multiple parameter control signal including said gain control signal.

23. The apparatus of claim 22 wherein
each said controllable amplifier includes a digital-to-analog converter and a voltage controlled amplifier,
said gain signal includes a multibit digital word that is provided to said digital-to-analog converter,
said digital-to-analog converter provides a control voltage to said voltage controlled amplifier, and
said voltage controlled amplifier controls said amplitude of said output signal based upon said control voltage.

24. The apparatus of claim 23 wherein said digital-to-analog converters provide slew limiting of said control voltage to eliminate control voltage artifacts in the sound output signal.

25. The apparatus of claim 22 wherein said controller provides address and control information to said sound signal processing circuit, and
said address and control information controls gain updating of particular controllable amplifiers.

26. The apparatus of claim 1 wherein said display has one or more mappable regions defined in said multidimensional space such that movement of a representation to a said region will cause automatic generation of a control signal affecting one or more parameters.

27. The apparatus of claim 26 wherein each said mappable region has an associated control signal including an audio parameter set.

28. The apparatus of claim 1 wherein said display has a fadeout region, and movement of a representation within the fadeout region in a predetermined direction results in accelerated fadeout of the output signal.

29. The apparatus of claim 1 wherein said display has amplitude indicators related to radial position relative to listener origin and angular position indicators related to angular position relative to listener origin.

30. The apparatus of claim 1 wherein said display includes a mix portion in which said visual representations are displayed and an information portion that displays values of left and right gain and angular position for said visual representation.

31. The apparatus of claim 1 wherein said controller includes means for storing state information as to the positions of said visual representations on said display, and means for recalling said state information to control the positions of said visual representations.

32. The apparatus of claim 31 wherein said state information is static state information indicating the instantaneous positions of said visual representations.

33. The apparatus of claim 31 wherein said state information is time dependent state information indicating the changes with time of the positions of said visual representations on said display.

34. The apparatus of claim 31 further comprising means to edit stored state information.

35. The apparatus of claim 33 wherein said interactive controller includes means for creating time dependent state information from static state information by determining gradual transitions between specified states in said static state information.

36. An apparatus for controlling multiple parameters effecting an audio mix output, said apparatus comprising
- a controller including a visual display for displaying a visual representation of an input sound signal in a multidimensional space and generating a multiple parameter control signal controlling multiple parameters effecting said audio mix output, each dimension of said multidimensional space separately controlling a mixing parameter or mixing parameters, said control signal being based upon the state of said representation in said multidimensional space, at least two said dimensions being the location of said representation on said visual display, a change in location of said representation on said display causing a change in two or more said mixing parameters,
- an input device connected to said controller to control the state of said representation in said multidimensional space so as to affect said audio mix output, and
- a sound signal processing circuit having a sound signal input for receiving a sound input signal, a sound signal output for providing a sound output signal, and a control signal input for receiving said multiple parameter control signal, said circuit modifying said sound input signal based upon said multiple parameter control signal to provide said sound output signal, wherein said display has a fadeout region, and movement of a representation within the fadeout region in a predetermined direction results in accelerated fadeout of the output signal.

37. The apparatus of claim 36 wherein said multidimensional space represents a multiple channel output mix environment, said multiple parameters include gains associated with each said output, and said sound signal processing circuit provides a plurality of output signals.

38. The apparatus of claim 37 wherein said multidimensional space represents a stereo mix environment, said multiple parameters include left and right gain, and said sound signal processing circuit provides a left sound output signal and a right sound output signal.

39. The apparatus of claim 38 wherein said multiple parameters include left front, center front, right front, and rear gain, and said sound signal processing system provides left front, center front, right front, and rear output signals.

40. The apparatus of claim 37 wherein said display has a hard left region with which a muted left gain control signal is associated and a hard right region with which a muted right gain control signal is associated.

41. The apparatus of claim 37 wherein said visual representation includes text indicating said sound input signal.

42. The apparatus of claim 36 wherein said controller is an interactive controller, and said input device is an interactive input device.

43. The apparatus of claim 36 wherein there are plural output channels, said multiple parameters include gains associated with respective outputs, and said display has a region which causes a muted gain signal for a said channel.

44. The apparatus of claim 36 further comprising a MIDI control line that is connected between said controller and said sound processing circuit and transmits said multiple parameter control signal.

45. The apparatus of claim 36 wherein said display has one or more mappable regions defined in said multidimensional space such that movement of a representation to a said region will cause automatic generation of a control signal affecting one or more parameters.

46. The apparatus of claim 45 wherein each said mappable region has an associated control signal including an audio parameter set.

47. An apparatus for controlling multiple parameters effecting an audio mix output, said apparatus comprising
- a controller including a visual display for displaying a visual representation of an input sound signal in a multidimensional space and generating a multiple parameter control signal controlling multiple parameters effecting said audio mix output, each dimension of said multidimensional space separately controlling a mixing parameter or mixing parameters, said control signal being based upon the state of said representation in said multidimensional space, at least two said dimensions being the location of said representation on said visual display, a change in location of said representation on said display causing a change in two or more said mixing parameters,
- an input device connected to said controller to control the state of said representation in said multidimensional space so as to affect said audio mix output, and
- a sound signal processing circuit having a sound signal input for receiving a sound input signal, a sound signal output for providing a sound output signal, and a control signal input for receiving said multiple parameter control signal, said circuit modifying said sound input signal based upon said multiple parameter control signal to provide said sound output signal,
- wherein said display displays a plurality of visual representations of respective input signals, and said sound signal processing circuit has a plurality of sound signal inputs, wherein said multidimensional space represents a multiple channel output mix environment with N output channels, said multiple parameters include a gain associated with each unique combination of an input sound signal and ann output sound signal, and said sound signal processing circuit provides N output signals and includes M times N controllable amplifiers, where M is the number of input signals, the outputs of said amplifiers that are associated with the same output channel being added to each other to provide said N output signals, each said controllable amplifier being connected to receive a said input sound signal and a unique gain control signal, said multiple parameter control signal including said gain control signal, wherein said controller provides address and control information to said sound signal processing circuit, and said address and control information controls gain updating of particular controllable amplifiers, wherein said sound signal processing circuit includes a decoder circuit, said decoder circuit receives said address and control information and provides enable signals to said controllable amplifiers, and said enable signals enable the gain updating of particular controllable amplifiers.

48. An apparatus for controlling multiple parameters effecting an audio mix output, said apparatus comprising a controller including a visual display for displaying a visual representation of an input sound signal in a multidimensional space and generating a multiple parameter control signal controlling multiple parameters effecting said audio mix output, each dimension of said multidimensional space separately controlling a mixing parameter or mixing parameters, said control signal being based upon the state of said representation in said multidimensional space, at least two said dimensions being the location of said representation on said visual display, a change in location of said representation on said display causing a change in two or more said mixing parameters, an input device connected to said controller to control the state of said representation in said multidimensional space so as to affect said audio mix output, and a sound signal processing circuit having a sound signal input for receiving a sound input signal, a sound signal output for providing a sound output signal, and a control signal input for receiving said multiple parameter control signal, said circuit modifying said sound input signal based upon said multiple parameter control signal to provide said sound output signal, wherein said multidimensional space represents a multiple channel output mix environment, said multiple parameters include gains associated with each said output, and said sound signal processing circuit provides a plurality of output signals, wherein said sound signal processing circuit includes a controllable amplifier to each said output signal, each said controllable amplifier being connected to receive said input sound signal and a gain control signal to provide a respective amplified sound input signal as said sound output signal, said multiple parameter control signal including said gain control signal, wherein said controller provides address and control information to said sound signal processing circuit, and said address and control information controls gain updating of particular controllable amplifiers, wherein said sound signal processing circuit includes a decoder circuit, said decoder circuit receives said address and control information and provides enable signals to said controllable amplifiers, and said enable signals enable the gain updating of particular controllable amplifiers.

49. An apparatus for controlling multiple parameters effecting an audio mix output, said apparatus comprising a controller including a visual display for displaying a visual representation of an input sound signal in a multidimensional space and generating a multiple parameter control signal controlling multiple parameters effecting said audio mix output, each dimension of said multidimensional space separately controlling a mixing parameter or mixing parameters, said control signal being based upon the state of said representation in said multidimensional space, at least two said dimensions being the location of said representation on said visual display, a change in location of said representation on said display causing a change in two or more said mixing parameters, an input device connected to said controller to control the state of said representation in said multidimensional space so as to affect said audio mix output, and a sound signal processing circuit having a sound signal input for receiving a sound input signal, a sound signal output for providing a sound output signal, and a control signal input for receiving said multiple parameter control signal, said circuit modifying said sound input signal based upon said multiple parameter control signal to provide said sound output signal, wherein said display displays a plurality of visual representations of respective input signals, and said sound signal processing circuit has a plurality of sound signal inputs, wherein said visual representations have changes in appearance that are associated with changes in value of a said multiple parameter.

50. The apparatus of claim 49 wherein said change in appearance is a change in color.

51. The apparatus of claim 49 wherein said change in appearance is a change in brightness.

52. The apparatus of claim 49 wherein said change in appearance is a change in size.

53. The apparatus of claim 49 wherein said change in appearance is a change in shape.

* * * * *